United States Patent
Etoh et al.

(10) Patent No.: US 7,903,519 B2
(45) Date of Patent: Mar. 8, 2011

(54) RECORDING MARK FORMATION METHOD, INFORMATION RECORDING DEVICE, INFORMATION RECORDING METHOD, AND INFORMATION RECORDING MEDIUM

(75) Inventors: Atsushi Etoh, Tenri (JP); Yoshihisa Adachi, Kyoto (JP); Mitsuo Ishii, Nabari (JP); Shigemi Maeda, Yamatokoriyama (JP); Hiroyasu Inoue, Tokyo (JP); Masaki Aoshima, Toyota (JP)

(73) Assignees: Sharp Kabushiki Kaisha, Osaka (JP); TDK Corporation, Tokyo (JP)

( * ) Notice: Subject to any disclaimer, the term of this patent is extended or adjusted under 35 U.S.C. 154(b) by 273 days.

(21) Appl. No.: 11/988,715

(22) PCT Filed: Jun. 20, 2006

(86) PCT No.: PCT/JP2006/312279
§ 371 (c)(1),
(2), (4) Date: Feb. 23, 2009

(87) PCT Pub. No.: WO2007/010695
PCT Pub. Date: Jan. 25, 2007

(65) Prior Publication Data
US 2010/0067346 A1 Mar. 18, 2010

(30) Foreign Application Priority Data
Jul. 15, 2005 (JP) .................................. 2005-207779

(51) Int. Cl.
*G11B 7/00* (2006.01)

(52) U.S. Cl. .................................... 369/59.11; 369/47.51
(58) Field of Classification Search ............... 369/59.11, 369/59.12, 59.24, 59.25, 47.5, 47.51, 47.46, 369/47.53
See application file for complete search history.

(56) References Cited

U.S. PATENT DOCUMENTS

| 6,611,481 B1 * | 8/2003 | Koishi et al. ............... 369/47.53 |
| 2005/0041552 A1 | 2/2005 | Shoji et al. |
| 2006/0285477 A1 | 12/2006 | Shoji et al. |

FOREIGN PATENT DOCUMENTS

| EP | 1 466 322 B1 | 10/2004 |
| JP | 08-124161 A | 5/1996 |
| JP | 09-044848 A | 2/1997 |
| JP | 2004-171735 A | 6/2004 |
| JP | 2004-355809 A | 12/2004 |
| JP | 2005-004949 | 1/2005 |

* cited by examiner

*Primary Examiner* — Nabil Z Hindi
(74) *Attorney, Agent, or Firm* — Edwards Angell Palmer & Dodge LLP; David G. Conlin; David A. Tucker

(57) ABSTRACT

In an information recording/reproducing device, a resting period (tm) is set to be constant regardless of a mark length of a recording mark and regardless of the number of divided recording pulses. Consequently, it is possible to provide an information recording device, an information recording method, and an information recording medium, each allowing formation of a recording mark with a uniform width by use of a low laser power and allowing reduction of the number of parameters for determining a recording waveform, when forming a long recording mark.

18 Claims, 16 Drawing Sheets

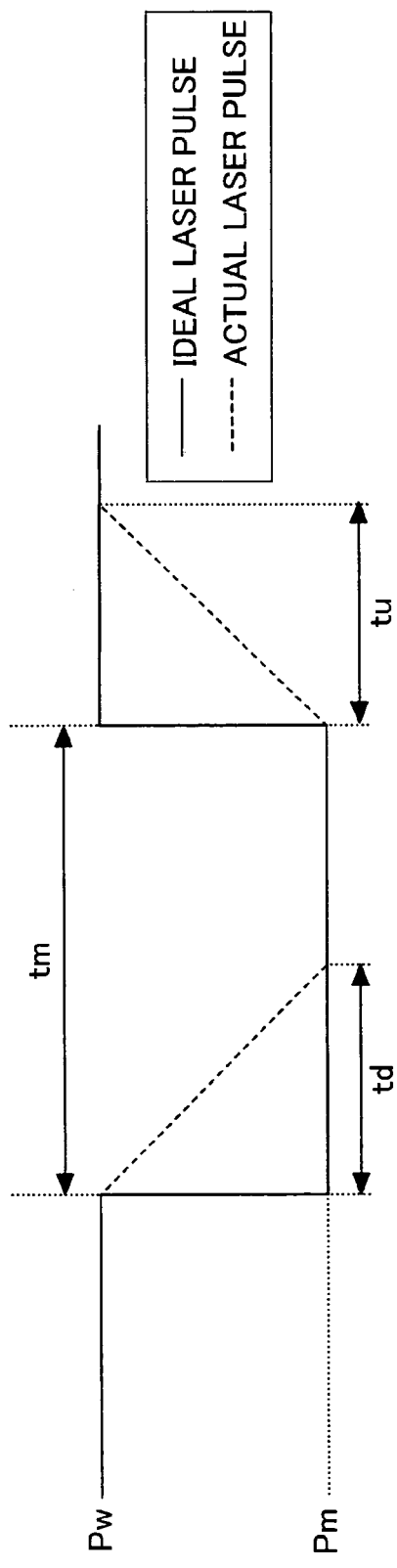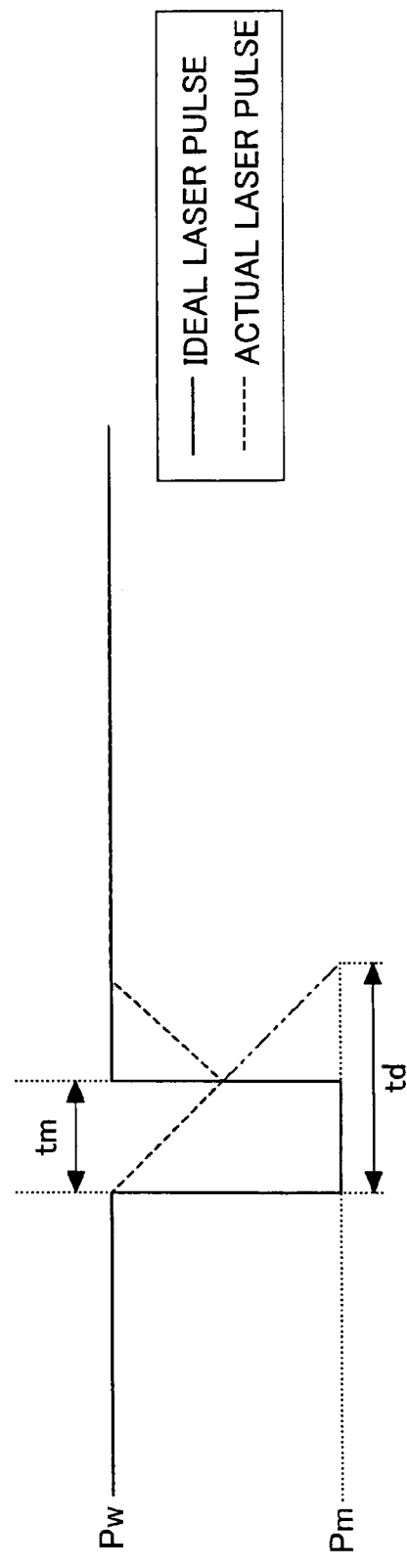
FIG. 13 (a) IN CASE WHERE tm IS LONGER THAN FALLING TIME OF LASER LIGHT
FIG. 13 (b) IN CASE WHERE tm IS SHORTER THAN FALLING TIME OF LASER LIGHT

RECORDING MARK FORMATION METHOD, INFORMATION RECORDING DEVICE, INFORMATION RECORDING METHOD, AND INFORMATION RECORDING MEDIUM

TECHNICAL FIELD

The present invention relates to: a recording mark formation method, an information recording device, and an information recording method, each of which is used for a high-density optical disc; and an information recording medium that is a high-density optical disc.

BACKGROUND ART

Optical discs such as CDs and DVDs, for which red semiconductor laser is used, have been widely used as information recording media for recording digital data (information). Examples of the optical discs include: an optical disc in which data is unrecordable and unrewritable (ROM optical disc); an optical disc in which data is recordable but unrewritable (recordable optical disc); and an optical disc in which data is rewritable (rewritable optical disc).

Information is recorded on an optical disc by irradiating laser light to a recording surface of the optical disc. A portion of the recording surface of the optical disc to which laser light is irradiated increases its temperature, which changes an optical recording medium constituting the optical disc. The change of the optical recording medium forms a recording mark on the recording surface of the optical disc. Binary digital data is recorded on the optical disc according to a period when the recording mark is formed (mark period) and to a period when the recording mark is not formed (space period).

A known method for forming a recording mark on an optical disc is such that a recording mark with a recording mark length nT based on a modulation law of a recording mark length is formed using (n-1) recording pulses or (n-2) recording pulses. However, in a case where recording velocity is increased (in a case of high velocity recording), this recording method requires more amount of recording laser power (recording power) and cannot secure a sufficient width of a recording pulse. Therefore, the recording method is not appropriate for high velocity recording.

On the other hand, a known recording method suitable for high velocity recording is a controlling and recording method of laser pulse in which each of recording marks with recording mark lengths of 2T to 8T (T: cycle of channel clock) are formed using one recording pulse, as illustrated in FIG. 15. The controlling and recording method is advantageous in that a pulse width of a recording laser pulse is more easily secured and a recording power may be relatively low compared with the recording method in which (n-1) recording pulses or (n-2) recording pulses are used.

Further, Patent Document 1 (Japanese Unexamined Patent Publication No. 2004-355809 (Tokukai 2004-355809; published on Dec. 16, 2004)) discloses a recording method capable of controlling the shape of a recording mark, in which method the number of recording pulses and a resting period are changed according to a mark length of a recording mark. Patent Document 1 describes a method in which a recording mark of 5T or less is recorded (recording mark is formed) using one recording pulse, whereas other recording mark (recording mark of 6T or more) is recorded using two or more recording pulses while changing a resting period according to a mark length of the recording mark.

DISCLOSURE OF INVENTION

However, the aforementioned recording method has the following problems.

In the controlling and recording method illustrated in FIG. 15, heat is accumulated on a recording surface of an optical disc at a time of forming a long recording mark in high-velocity recording. Consequently, an information recording medium (medium) has a higher temperature on a more rear portion of the recording mark. As a result, it is difficult to form a recording mark with a uniform width (a width in a direction perpendicular to a track direction).

Further, in a recording method in which the controlling and recording method is applied to a recording waveform of Patent Document 1, a recording power is set to be low. Consequently, as recording velocity increases, energy density per unit time that is poured into the medium drops. As the mark length of the recording mark is longer, irradiation period during which laser of a middle power (recording power lower than the above recording power) is irradiated (resting period) gets longer, resulting in smaller energy poured into the medium. This causes the recording mark width at the resting period to be narrower, which makes it difficult to form a recording mark with a uniform width as a whole. That is, as the recording mark gets longer, the resting period gets longer, resulting in shortage of an increase in the temperature of the medium.

For example, FIG. 16 shows a reproduction signal (RF signal) that was recorded with blue violet semiconductor laser under conditions that linear velocity was 21.12 m/s, frequency of channel clock was 264 MHz, recording power Pw was 6.3 mW, recording power Ps (=Pm) at resting period was 2.8 mW, power Pc at cooling period positioned at the last of a recording pulse was 0.6 mW.

FIG. 16 shows a case where a mark length of a recording mark is 7T and the recording mark is recorded with two recording pulses.

A full line of the RF signal (reproduction signal) in FIG. 16 represents a conventional reproduction waveform (resting period is 2T) and a broken line of the RF signal in FIG. 16 represents an ideal recording waveform (resting period is 1T). Comparison of the reproduction waveforms shows that the conventional recording waveform does not have enough reproduction signal level from the beginning of a recording mark, which does not ensure stable shape of the recording mark (does not ensure a uniform width of the recording mark).

In order to prevent the above problem, it is necessary to cause the medium to increase its temperature highly enough to form a front end and a rear end of the recording mark. This requires an increase in a laser power of recording pulses for the front end and the rear end. In addition, it is necessary for the recording power at the resting period to prevent drop in the temperature of the medium. This requires an increase in the recording power in the resting period. That is, it is necessary to increase a whole recording power level.

Further, it is necessary to optimally set the resting period according to the mark length of the recording mark. This requires more number of parameters for determining the recording waveform.

The present invention was made in view of the foregoing problems. An object of the present invention is to provide a recording mark formation method, an information recording device, an information recording method, and an information recording medium, each allowing formation of a recording mark with a uniform width by use of a low laser power and allowing reduction of the number of parameters for determining a recording waveform, when forming a long recording mark.

The recording mark formation method of the present invention is a recording mark formation method, including the step of forming a recording mark in such a manner that a recording mark with less than a predetermined mark length is formed using one recording pulse with a first recording power and a recording mark with a predetermined mark length or more is formed using a plurality of recording pulses each with a first recording power that are divided by a resting period with a second recording power less than the first recording power, the resting period being set to be constant regardless of the mark length of the recording mark and regardless of the number of the divided recording pulses.

The information recording method of the present invention is an information recording method, including the step of forming a recording mark on a recording medium in such a manner that a recording mark with less than a predetermined mark length is formed using one recording pulse with a first recording power and a recording mark with a predetermined mark length or more is formed using a plurality of recording pulses each with a first recording power that are divided by a resting period with a second recording power less than the first recording power, the resting period being set to be constant regardless of the mark length of the recording mark and regardless of the number of the divided recording pulses.

The information recording device of the present invention is an information recording device, including recording mark formation means for forming a recording mark on an information recording medium by irradiating laser light, the recording mark formation means forming a recording mark in such a manner that a recording mark with less than a predetermined mark length is formed using one recording pulse with a first recording power and a recording mark with a predetermined mark length or more is formed using a plurality of recording pulses each with a first recording power that are divided by a resting period with a second recording power less than the first recording power, and the recording mark formation means setting the resting period to be constant regardless of the mark length of the recording mark and regardless of the number of the divided recording pulses.

With the arrangement, a recording mark with less than a predetermined mark length is formed using one recording pulse with a first recording power, and a recording mark with a predetermined length or more is formed using (i) a resting period with a second recording power lower than the first recording power and (ii) a plurality of recording pulses each with a first recording power that are divided by the resting period. Therefore, it is possible to prevent accumulation of heat on a recording surface of the information recording medium.

As described above, in a conventional information recording device, in a case of forming a recording mark with a plurality of recording pulses, as a recording mark gets longer, a resting period gets longer. Consequently, a medium does not increase its temperature enough. This narrows the width of a recording mark in the resting period and makes it difficult to form a uniform recording mark.

In contrast, with the above arrangement, the resting period is set to be constant regardless of the mark length of the recording mark and regardless of the number of the divided recording pulses. This ensures a sufficient increase in a temperature of a medium in the resting period, enabling the width of the recording mark in the resting period to be uniform. Consequently, it is possible to make the width of the recording mark to be uniform.

Further, as it is unnecessary to determine the resting period in accordance with the mark length of the recording mark, it is possible to reduce the number of parameters for determining the recording waveform. Therefore, it is possible to simplify a circuit configuration of the information recording device.

This allows formation of a recording mark with a uniform width by use of a low laser power and allows reduction of the number of parameters for determining a recording waveform, when forming a long recording mark.

Additional objects, features, and strengths of the present invention will be made clear by the description below. Further, the advantages of the present invention will be evident from the following explanation in reference to the drawings.

BRIEF DESCRIPTION OF DRAWINGS

FIG. 13(a) is a drawing illustrating a laser pulse in a case where a resting period tm is longer than falling time of laser light.

FIG. 13(b) is a drawing illustrating a laser pulse in a case where tm is shorter than falling time of laser light.

BEST MODE FOR CARRYING OUT THE INVENTION

The following explains an embodiment of the present invention with reference to drawings.

An information recording/reproducing device (present device; information recording device) of the present embodiment records information (data; digital data) in an optical disc (information recording medium) such as a CD and a DVD, and reproduces the information from the optical disc.

Figure 2:
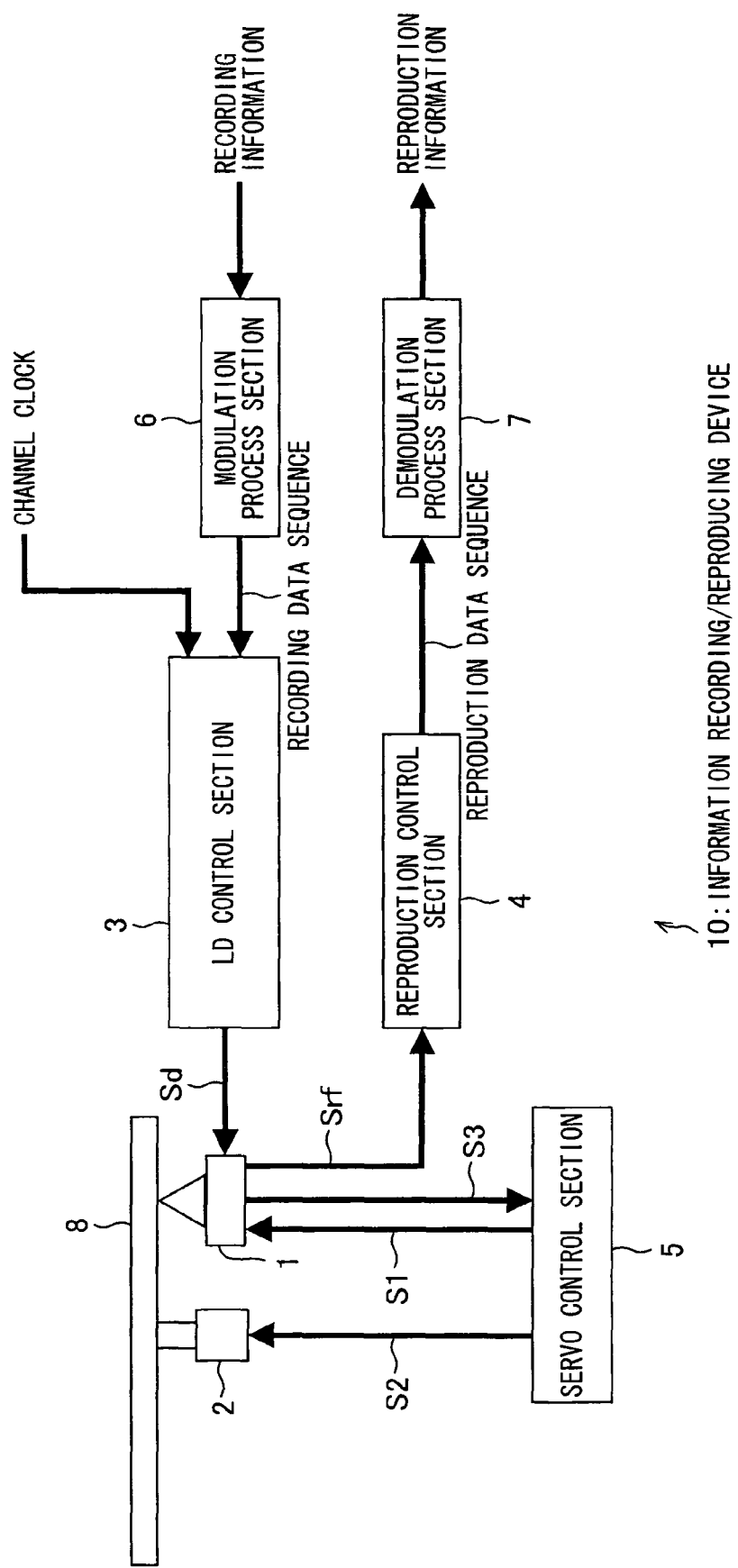
FIG. 2 is a block diagram schematically illustrating a configuration of an information recording/reproducing device of the present embodiment.

As illustrated in FIG. 2, a present device 10 includes an optical pickup 1, a spindle motor 2, an LD control section 3, a reproduction control section 4, a servo control section 5, a modulation process section 6, and a demodulation process section 7. An optical disc 8 is positioned to face the present device 10. The LD control section 3, the modulation process section 6, the servo control section 5, and the optical pickup 1 constitute recording mark formation means.

[Structure of Optical Disc]

The optical disc 8 can be used in a next-generation DVD device that has high channel clock frequency and that records/reproduces information using blue violet semiconductor laser. A rewritable optical disc such as BD-RE or a recordable optical disc can be used in this next-generation DVD device. An explanation of the optical disc 8 of the present embodiment is made as to the recordable optical disc, but the optical disc 8 is not limited to this.

Figure 3:
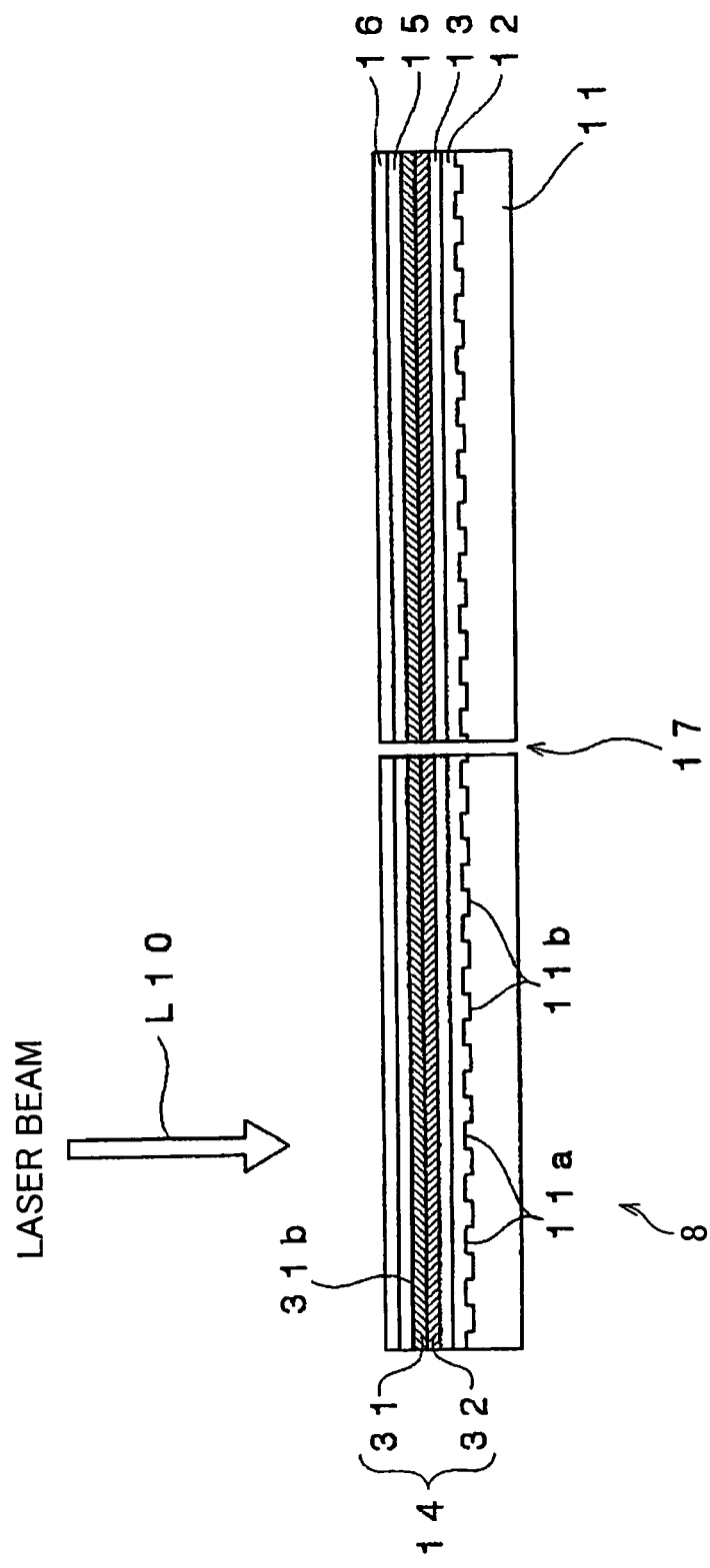
FIG. 3 is a cross sectional drawing schematically illustrating a structure of an optical disc in the present embodiment.

As illustrated in FIG. 3, the optical disc 8 includes a substrate 11, a reflective layer 12, a second dielectric layer 13, a recording layer 14, a first dielectric layer 15, and an optical transparent layer 16 that are laminated in this order. Further, a hole 17 for chucking is provided at the center of the optical disc 8. The optical pickup 1 (FIG. 2) irradiates light beam (laser beam) L10 to the optical disc 8. Irradiation of the light beam L10 enables recording/reproducing data to/from the optical disc 8. The optical beam L10 is irradiated to the optical disc 8 from a direction where the optical transparent layer 16 exists.

The optical disc 8 includes a user area where information is recorded/reproduced. A lead-in area is provided on an internal track adjacent to the user area, and a lead-out area is provided on an external track adjacent to the user area. The lead-in area and the lead-out area ensure recording/reproducing operation at the innermost track and the outermost track of the user area. In the present embodiment, information for setting recording/reproducing conditions necessary for optimal recording/reproducing is recorded in the lead-in area.

However, the information may be recorded in the lead-out area or may be recorded both in the lead-in area and the lead-out area.

The substrate 11 serves as a base substrate (base) for securing mechanical strength necessary for the optical disc 8. Grooves 11a with a convex shape and lands 11b with a concave shape are provided on the surface of the substrate 11 so that the grooves 11a and the lands 11b are positioned alternately from the internal track to the external track. The grooves 11a and the lands 11b serve as guide tracks for the laser beam L10 at a time of recording/reproducing data. The thickness of the substrate 11 is approximately 1.1 mm. The material of the substrate 11 is preferably polycarbonate resin for example in view of workability etc.

The reflective layer 12 reflects the laser beam L10 and emits the beam thus reflected (not shown) via the optical transparent layer 16. The thickness of the reflective layer 12 preferably ranges from 20 nm to 200 nm for example.

The material of the reflective layer 12 is not particularly limited as long as the material can reflect the laser beam L10. Examples of the material include Mg, Al, Ti, Cr, Fe, Co, Ni, Cu, Zn, Ge, Ag, Pt and Au. Among them, it is preferable to use Al, Au, Ag, Cu or an alloy thereof (such as an alloy of Ag and Cu) in view of high reflectance.

The first dielectric layer 15 and the second dielectric layer 13 protect the recording layer 14 provided therebetween. The recording layer 14 is sandwiched by the first dielectric layer 15 and the second dielectric layer 13. This allows effectively preventing deterioration of information recorded in the recording layer 14 for a long time after optical recording.

Material of the first dielectric layer 15 and the second dielectric layer 13 is not particularly limited as long as the material is a transparent dielectric. The material may include, as a main component, at least one oxide, sulfate, or nitride selected from the group consisting of $Al_2O_3$, AlN, ZnO, ZnS, GeN, GeCrN, CeO, SiO, $SiO_2$, SiN, and SiC, or combination thereof. The thickness of the first dielectric layer 15 and the second dielectric layer 13 is not particularly limited. The thickness preferably ranges from 3 nm to 200 nm.

Figure 4:
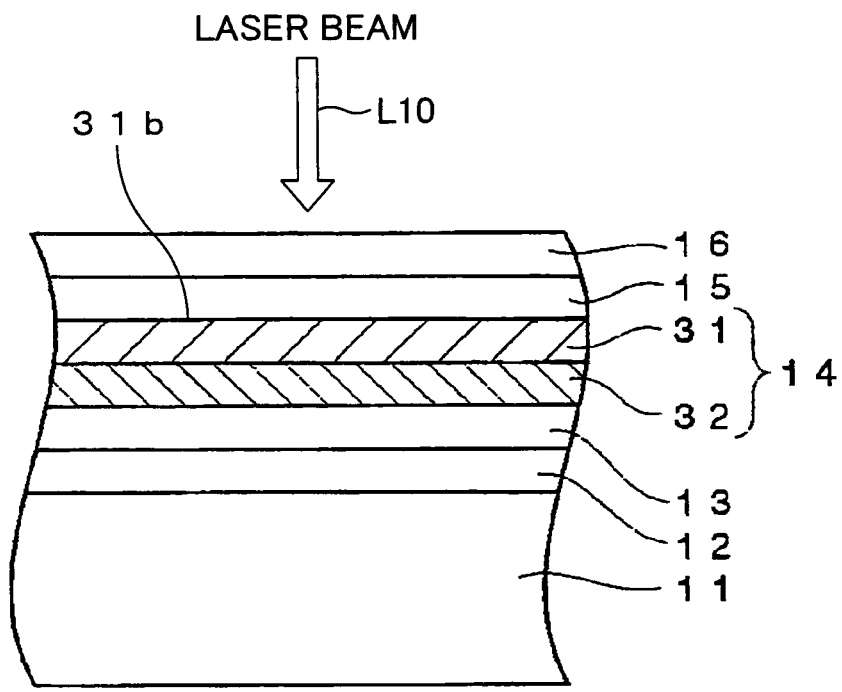
FIG. 4(a) is a cross sectional drawing schematically illustrating a structure of an optical disc before irradiation of laser light.
FIG. 4(b) is a cross sectional drawing schematically illustrating a structure of an optical disc after irradiation of laser light.
Figure 4:
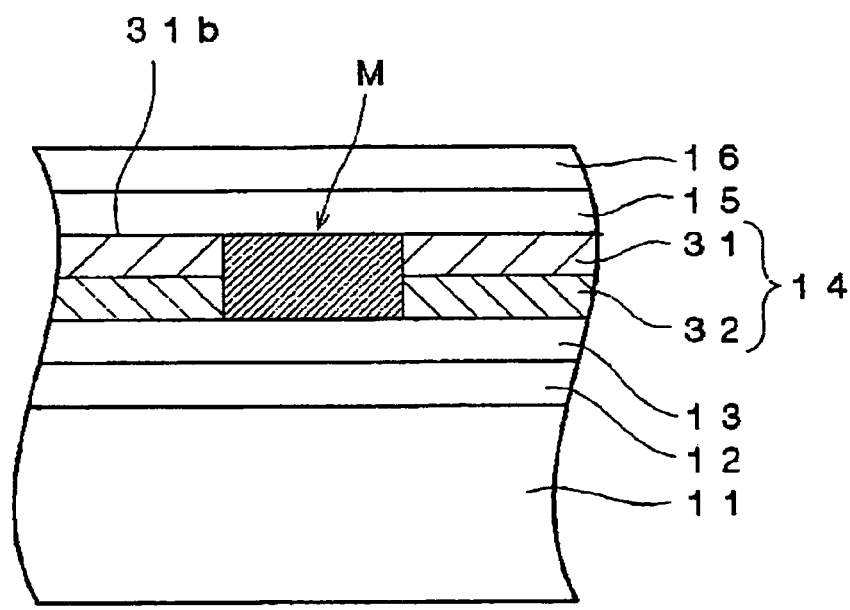

The recording layer 14 is a layer on which a recording mark M (see FIG. 4(b)) is formed. The recording layer 14 includes a first reactive layer 31 and a second reactive layer 32 adjacent to the first reactive layer 31. The second reactive layer 32 is provided closer to the substrate 11 and the first reactive layer 31 is provided closer to the optical transparent layer 16. An unrecorded area of the recording layer 14 has a structure in which the first reactive layer 31 and the second reactive layer 32 are simply laminated as illustrated in FIG. 4(a).

When the laser beam L10 with a predetermined power or more is irradiated to the recording layer 14, heat by the laser beam L10 partially or wholly diffuses an element that constitutes the first reactive layer 31 and an element that constitutes the second reactive layer 32, so that the elements are mixed to be the recording mark M as illustrated in FIG. 4(b). In the recoding layer 14, the mixed portion where the recording mark M is formed and other portion have greatly different reflectance with respect to reproduction light. The difference in reflectance allows recording/reproducing of data.

In other words, information is recorded on the optical disc 8 as follows: when the laser beam L10 is irradiated to the optical disc 8, the element that constitutes the first reactive layer 31 and the element that constitutes the second reactive layer 32 are heated by the laser beam L10, so that the elements move and are mixed. The mixed portion is the recording mark M as illustrated in FIG. 4(b). The reflectance of the mixed portion where the recording mark M is formed is sufficiently different from the reflectance of other portion (unrecorded area) of the recording layer 14. With the difference in reflectance, it is possible to record/reproduce data.

The first reactive layer 31 and the second reactive layer 32 have respective main components that are different from each other. The main components are selected from the group consisting of Al, Si, Ge, C, Sn, Au, Zn, Cu, B, Mg, Ti, Mn, Fe, Ga, Zr, Ag, and Pt. When the materials of the first reactive layer 31 and the second reactive layer 32 include such main components, it is possible to increase reliability in long-time storage of information. The thickness of the recording layer 14 is not particularly limited. The thickness preferably ranges from 2 nm to 40 nm.

The thickness of the first reactive layer 31 and the thickness of the second reactive layer 32 are not particularly limited. In order to sufficiently suppress a noise level of a reproduction signal, to secure sufficient recording sensibility, and to secure sufficiently large change in reflectance before and after recording, it is preferable that both of the thickness ranges from 1 nm to 30 nm and a ratio of the thickness of the first reactive layer 31 to the thickness of the second reactive layer 32 (thickness of the first reactive layer 31/thickness of the second reactive layer 32) ranges from 0.2 to 5.0.

The optical transparent layer 16 is a layer to which the laser beam L10 is incident and is a layer serving as a light path of the laser beam L10. Preferable thickness of the optical transparent layer 16 ranges from 50 µm to 150 µm. The material of the optical transparent layer 16 is not particularly limited. The material is preferably acrylic resin or epoxy resin that is cured in response to ultraviolet ray. Instead of such ultraviolet curing resin, the optical transparent layer 16 may be made of an optical transparent sheet made of optical transparent resin and an adhesive or an agglutinant.

The optical disc 8 may be not only the recordable optical disc as described above, but also a phase change medium or a medium for recording information by use of an increase in the temperature of a medium that is subjected to laser irradiation.
[Structure of Present Device]

The optical pickup 1 irradiates recording beam (light beam; laser beam) or reproduction beam (light beam; laser beam). The spindle motor 2 controls rotation of the optical disc 8 while being chucked in the hole 17 of the optical disc 8.

The LD control section 3 receives a recording data sequence subjected to a modulation process by the modulation process section 6, generates a driving signal Sd for driving a semiconductor laser (light source; not shown) provided inside the optical pickup 1, and supplies the driving signal Sd to the optical pickup 1.

The reproduction control section 4 receives a reading RF signal Srf output from the optical pickup 1, performs waveform equalization and binarization etc. with respect to the reading RF signal Srf, generates a reproduction data sequence, and supplies the reproduction data sequence to the modulation process section 7.

The servo control section 5 receives a servo signal S3 such as a tracking error signal and a focus error signal from the optical pickup 1. In accordance with the servo signal S3, the servo control section 5 supplies an optical pickup control signal Si to the optical pickup 1 and supplies a spindle control signal S2 to the spindle motor 2. Thus, various servo processes such as a tracking servo, a focus servo, and a spindle servo are performed.

The modulation process section 6 performs a modulation process with respect to recording information from the outside so as to generate a recording data sequence, and supplies the recording data sequence to the LD control section 3. The demodulation process section 7 performs a demodulation process with respect to the reproduction data sequence from the reproduction control section 4 and supplies reproduction information to the outside of the present device 10. The present embodiment mainly relates to a recording method, and accordingly a reproduction control, a servo control, a modulation process and a demodulation process may be performed through various known methods. So, explanations thereof are omitted here. In the present embodiment, the information recording/reproducing device (present device) 10 is used. However, an information recording device for recording only may be used.
[Operation of Present Device]

The following briefly explains an information recording process (operation) of the present device 10.

Recording information to be recorded on the optical disc 8 is supplied from an external device (not shown) to the modulation process section 6. The modulation process section 6 performs a (1, 7) RLL modulation process with respect to the recording information and supplies a recording data sequence to the LD control section 3.

As illustrated in FIG. 2, the LD control section receives not only the recording data sequence but also a channel clock (cycle T) for the recording data sequence, and drives and controls a laser diode (semiconductor laser, light source) in the optical pickup 1 in accordance with the recording data sequence. At that time, the servo control section 5 performs various servo controls and a control of a location of recording on the optical disc 8. Thus, information is recorded on a predetermined position of the optical disc 8.
[Method for Recording Information on Optical Disc]

A method for recording information with use of the present device is such that the LD control section 3 generates, in accordance with the recording data sequence, a driving signal Sd for driving and controlling the laser diode in the optical pickup 1, and the light source irradiates laser light onto the optical disc 8 in accordance with the driving signal Sd, thereby forming the recording mark M on the optical disc 8.

A period when information is recorded on the optical disc 8 include: a period when the recording mark M is formed on the optical disc 8 (mark period; mark forming period); and a period when the recording mark M is not formed on the optical disc 8 (space period). With the two periods, binary digital data is recorded on the optical disc 8. In a case of an information recording device used in high-velocity next-generation DVD, recording of information requires control of a laser pulse with a very short mark period ranging from 7.58 ns (2T) to 30.30 ns (8T).

Figure 1:
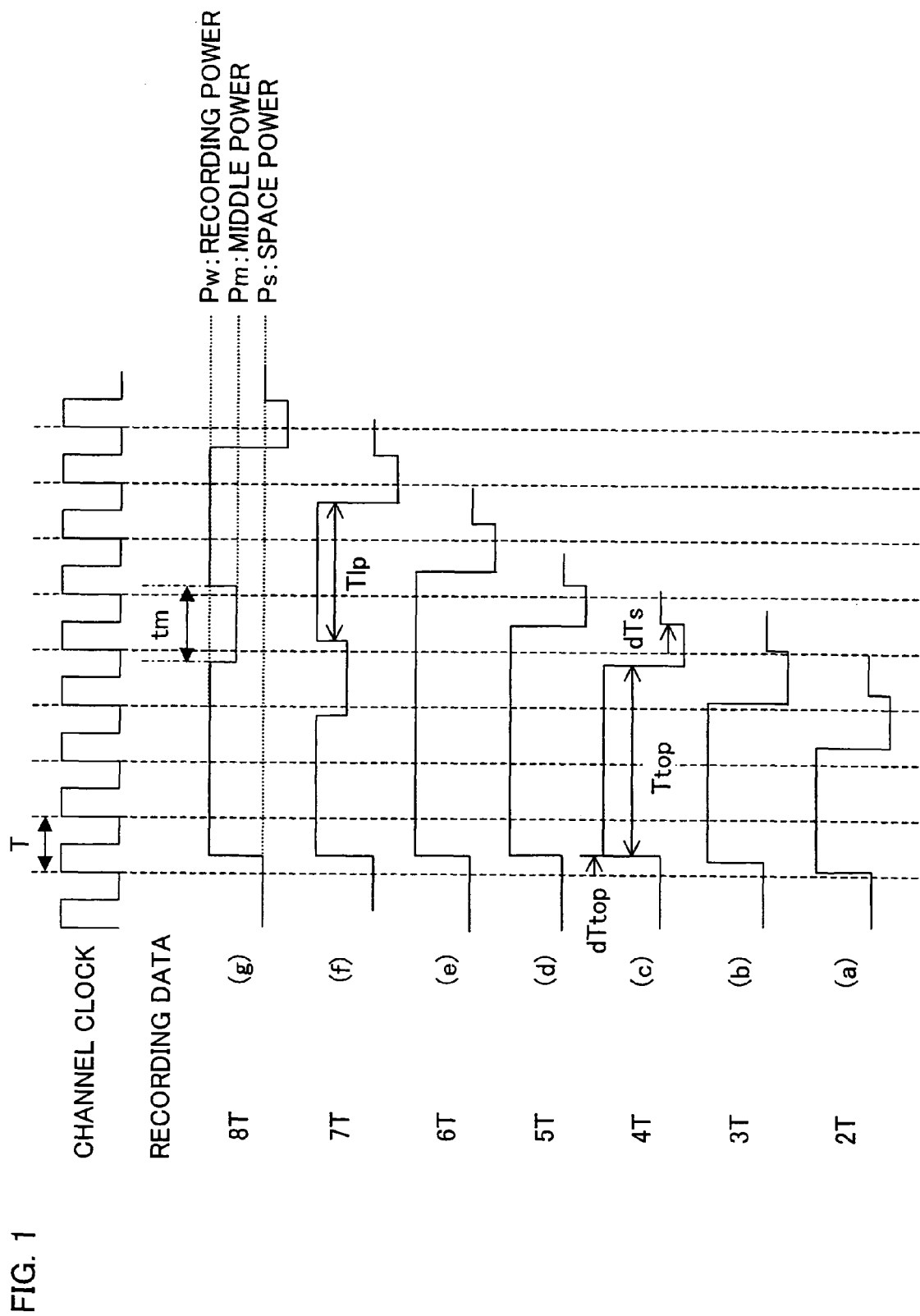
FIG. 1 is a waveform chart illustrating a laser pulse in an information recording method of the present embodiment.

FIG. 1 is a drawing schematically illustrating a laser pulse used in an information recording method of the present embodiment. Specifically, a recording mark M with a recording mark length nT (2T to 8T) based on a modulation law of a recording mark length is formed using a recording power (first recording power) Pw, a middle power (second recording power) Pm, and a space power Ps. Further, FIG. 1 illustrates a waveform of a channel clock T. In FIG. 1, a longitudinal axis represents the size of a laser power, and a lateral axis represents a time. As illustrated in FIG. 1, each of recording marks M with mark lengths of 2T, 3T, 4T, 5T, and 6T, respectively (short mark group; recording mark with a predetermined mark length or less) is formed using one recording pulse with the recoding power Pw (see waveforms (a) to (e)). The recording pulse is generated in the LD control section 3.

On the other hand, recording marks M with mark lengths of 7T or more (long mark group; recording mark with a predetermined mark length or more) are formed using two recording pulses with the recording power Pw (see waveforms (f) and (g)). The recording pulses are generated in the LD control section 3. Specifically, each mark belonging to the long mark group is made of two recording pulses divided by a resting period tm that has a predetermined length and that has a laser power (middle power Pm) less than the recording power Pw. Alternatively, the recording marks M with 2T, 3T, 4T, and 5T may be regarded as belonging to the short mark group and the recording marks M with 6T or more may be regarded as belonging to the long mark group.

As described above, the recording mark M belonging to the short mark group is formed using one recording pulse, whereas the recording mark M belonging to the long mark group is formed using two recording pulses divided by a resting period. Consequently, it is possible to secure a laser pulse width necessary for formation of a short mark and to form a long mark in consideration of heat accumulation.

Particularly noteworthy is that in the present embodiment, the resting period tm is constant regardless of the mark length of the recording mark M and regardless of the number of divided recording pulses, as illustrated in FIG. 1 (see waveforms (f) and (g)). Consequently, it is possible to ensure a sufficient increase in temperature of the optical disc 8 in the resting period tm, and to uniform the width of the recording mark M in the resting period tm. Further, since it is unnecessary to determine the resting period tm according to the mark length of the recording mark M, it is possible to reduce the number of parameters for determining a recording waveform. This simplifies a circuit configuration (not shown) of the present device.

In general, in the case of providing the resting period tm, energy (power) comes short, the width of the recording mark M (width in a direction perpendicular to a track direction) in the resting period tm drops, and the mark length of the recording mark M gets shorter than a desired length. In contrast, in the present embodiment, a pulse width T1$p$ (see waveform (f)) of a rear recording pulse (second recording pulse in a case where two recording pulses are used; second recording pulse) is adjusted so that the recording mark M has a desired mark length. As for setting of a recording waveform, a recording waveform that belongs to a short mark group and that is formed with one recording pulse is represented by parameters as follows: a starting position dTtop of the recording pulse; a pulse width Ttop of the recording pulse; and a cooling period dTs. On the other hand, a recording waveform that belongs to a long mark group and that includes the resting period tm is represented by minimum parameters consisting of the above parameters and only the pulse width T1$p$ of the second recording pulse.

It is desirable that the recording waveform belonging to the long mark group meets relations $2.5T \leq Ttop \leq 4T$ and $2T \leq T1p \leq 4T$ in order to prevent accumulation of heat during formation of the recording mark M by the recording power and to stabilize the recording mark length.

The following explains the result of detailed examination of the information recording method. In the following, linear velocity of recording is 21.12 m/s and frequency of channel clock of recording is 264 MHz. Linear velocity of reproduction after the recording is 5.28 m/s and frequency of channel clock of reproduction after the recording is 66 MHz. Optimal laser power is determined such that a recording power Pw is 6.3 mW, a space power Ps that is set for a space period is 2.8 mW, and a middle power Pw is the same as the space power Ps. The optical pickup 1 with a light wavelength of 406 nm and with a numerical aperture (NA) of 0.85 is used. The following explains the shape of a recording mark M that is formed when one recording pulse is used in the present device 10 under the above conditions.

In a mark period of n (n is 6, 7, or 8) T, a signal level (level) of a third reading RF signal Srf out of n reading RF signals Srf having been sampled with respect to each channel clock T is regarded as Ls, and Ls is used as an index indicative of a width of a front end of the recording mark M. Further, a level of a reading RF signal Srf that is third to the last is regarded as Le, and Le is used as an index indicative of a width of a rear end of the recording mark M.

On the other hand, in a mark period of n (n is 5) T, a level of a second reading RF signal Srf out of n reading RF signals Srf having been sampled with respect to each channel clock T is regarded as Ls, and Ls is used as an index indicative of a width of a front end of the recording mark M. Further, a level of a reading RF signal Srf that is second to the last is regarded as Le, and Le is used as an index indicative of a width of a rear end of the recording mark M.

Figure 5:
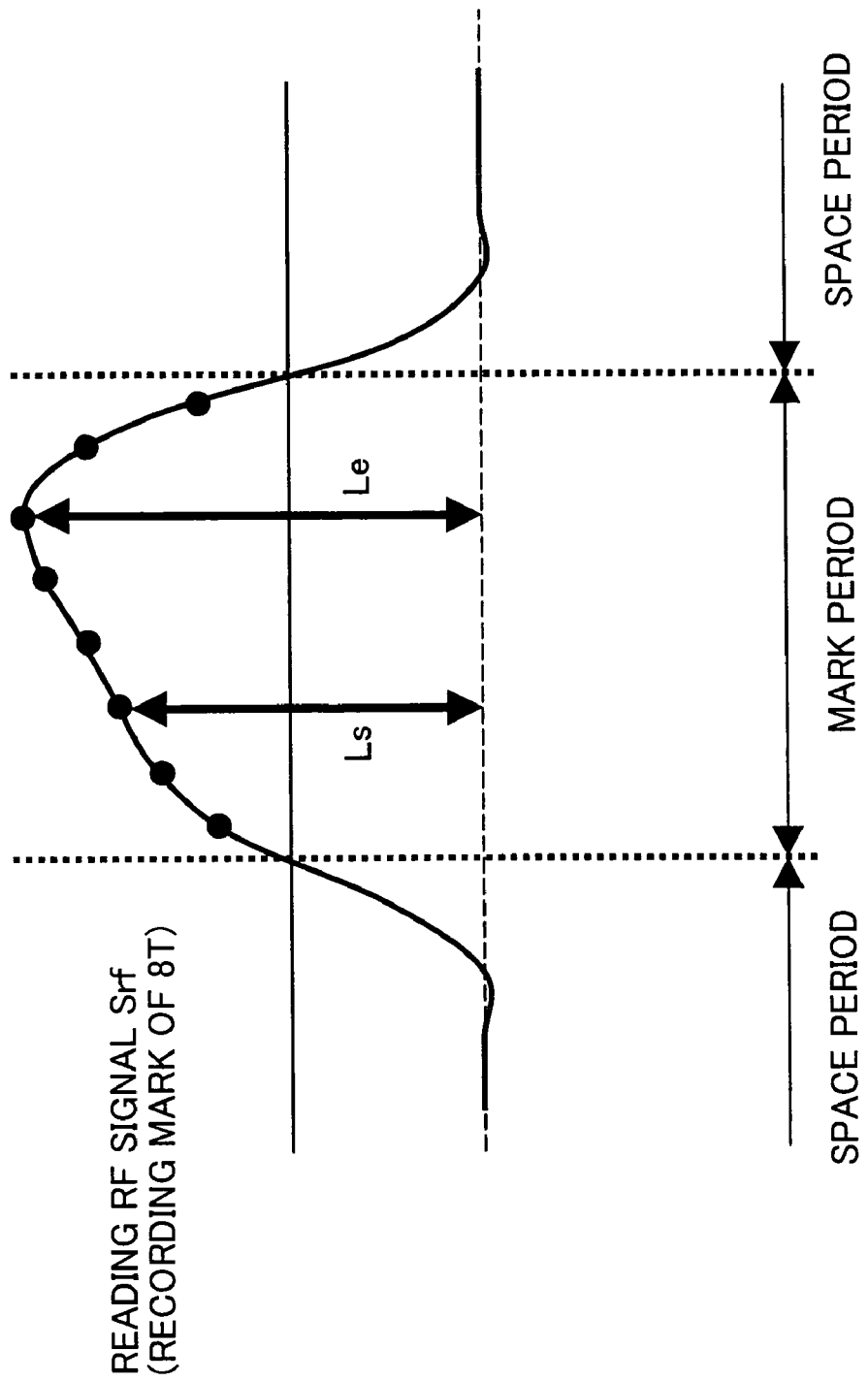
FIG. 5 is a drawing illustrating a reading RF signal Srf read from a recording mark with a length of 8T that is obtained from an optical pickup.

FIG. 5 is a drawing illustrating a reading RF signal Srf obtained from the optical pickup 1 in a case of forming the recording mark T of 8T. FIG. 5 illustrates a case where a resting period is not provided, i.e., a case where the recording mark M of 8T is formed using one recording pulse. In this case, as illustrated in FIG. 5, Ls<Le. In order to form a recording mark M with a uniform width, it is ideal to meet a relation Ls=Le (a ratio in a level of the reading RF signal Srf between the front end and the rear end of the recording mark M; a ratio in width between the front end and the rear end of the recording mark M; Le/Ls=100%).

Ls>Le indicates that the width of the rear end of the recording mark M is narrower than the width of the front end of the recording mark M. Ls<Le indicates that the width of the rear end of the recording mark M is wider than the width of the front end of the recording mark M. That is, both in the cases of Ls>Le and Ls<Le, the line width of the recording mark M is not constant. Consequently, when the recording mark M of 8T is formed using one recording pulse, the width of the rear end of the recording mark M is wider than the width of the front end of the recording mark M.

Figure 6:
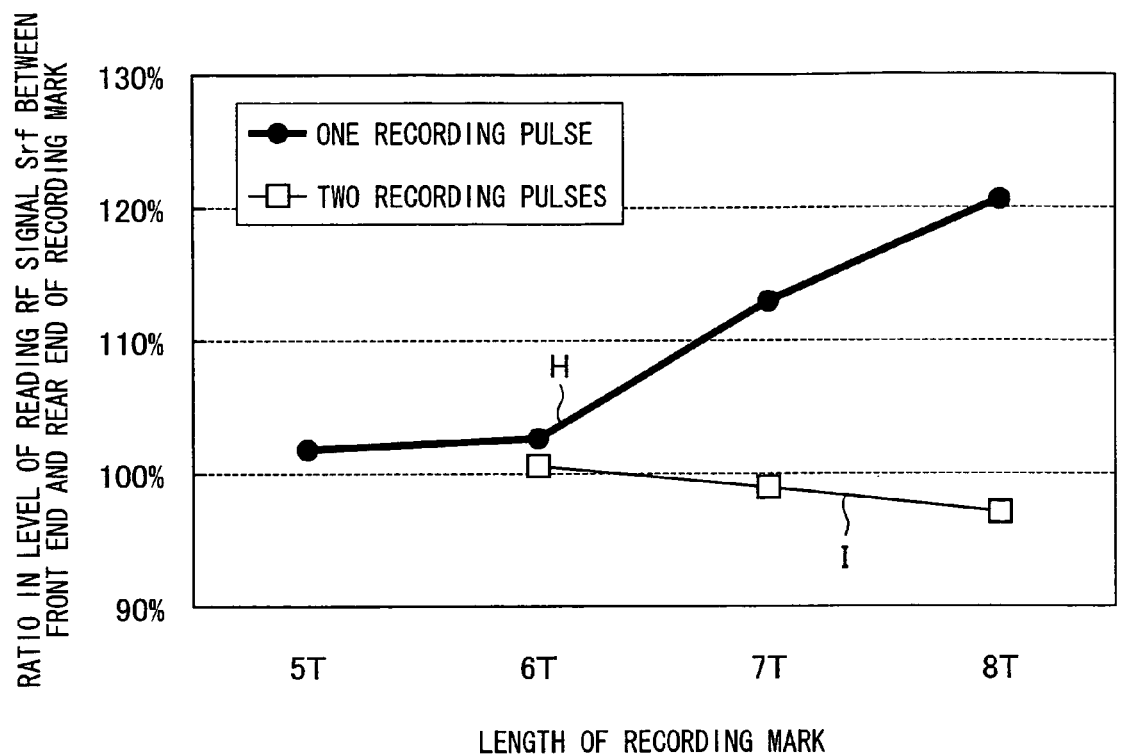
FIG. 6 is a graph illustrating a ratio in a level of a reading RF signal Srf between a front end and a rear end of a recording mark formed with a laser pulse including one or two recording pulses.

FIG. 6 illustrates the results of measurements of: Le/Ls of recording marks M of 5T, 6T, 7T, and 8T that are formed using one recording pulse (see graph H); and Le/Ls of recording marks M of 6T, 7T, and 8T that are formed using two recording pulses with a constant resting period (see graph I).

As illustrated in FIG. 6, in the case where the recording mark M of 5T is recorded using one recording pulse and in the case where the recording mark M of 6T is recorded using one recording pulse, Le/Ls is near 100% (almost Le=Ls; see graph H).

In contrast, in the case where the recording mark M of 7T is formed using one recording pulse, Le/Ls>100%, and the width of the rear end of the recording mark M is wider than the width of the front end of the recording mark M (see graph H). In the case where recording mark M of 8T is formed using one recording pulse, the width of the rear end of the recording mark M is further wider than the width of the front end of the recording mark M, compared with the case of the width of the rear end of the recording mark M of 7T (see graph H).

However, as illustrated in FIG. 6, in the case where the recording mark M of 7T or 8T is formed using two recording pulses divided by the resting period tm that is constant (regardless of the mark length), Le/Ls is almost 100% and the recording mark M has a uniform width (see graph I). Furthermore, in the case where the recording mark M of 6T is formed using two recording pulses divided by the resting period tm that is constant, Le/Ls is almost 100% and the recording mark M has a uniform width (see graph I).

Therefore, it is possible to form a recording mark M with a uniform width in such a manner that one recording pulse is used to form a recording mark M of 5T or less and two recording pulses with a constant resting period tm are used to form a recording mark of 6T or more, or in such a manner that one recording pulse is used to form a recording mark M of 6T or less and two recording pulses with a constant resting period tm are used to form a recording mark of 7T or more.

It was examined how jitter of the rear end of the recording mark M changed with respect to a change of a rear end position of the last recording pulse in the case of using one recording pulse and in the case of using two recording pulses.

Figure 7:
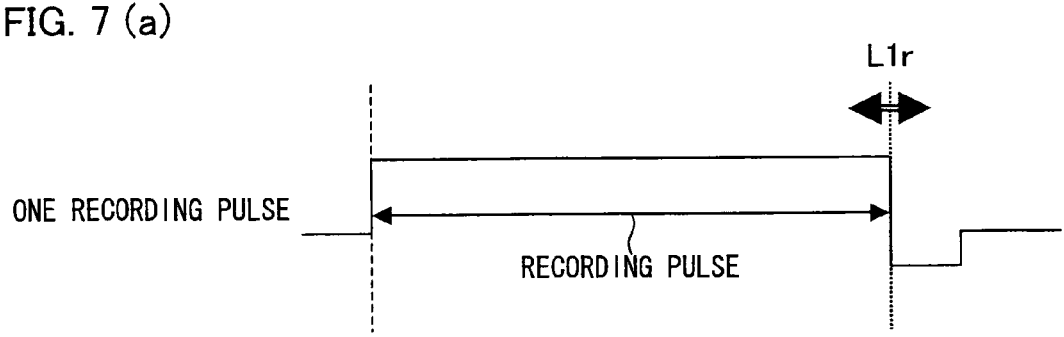
FIG. 7(a) is a drawing illustrating a rear end position of a last recording pulse in a case of using one recording pulse in an information recording method of the present embodiment.
FIG. 7(b) is a drawing illustrating a rear end position of a last recording pulse in a case of using two recording pulses in an information recording method of the present embodiment.
Figure 7:
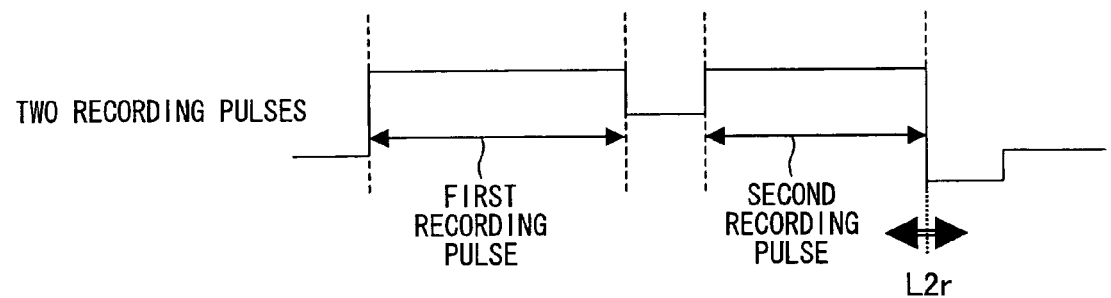

In the case of using one recording pulse, a rear end position L1r of the recording pulse (the last recording pulse) was moved as illustrated in FIG. 7(a), and it was measured how jitter changed. On the other hand, in the case of using two recording pulses, a rear end position L2r of the second recording pulse (the last recording pulse) was moved as illustrated in FIG. 7(b), and it was measured how jitter changed.

Using a random pattern, the changes of jitters were measured through four methods (first to fourth methods) and the changes were compared with one another. In the first method, the recording marks M of 5T or less were formed using one recording pulse and other recording marks M were formed using two recording pulses. In the second method, the recording marks M of 6T or less were formed using one recording pulse and other recording marks M were formed using two recording pulses. In the third method, the recording marks M of 7T or less were formed using one recording pulse and other recording marks M were formed using two recording pulses. In the fourth method, the recording marks of 8T or less were formed using one recording pulse and other recording marks M were formed using two recording pulses.

Figure 8:
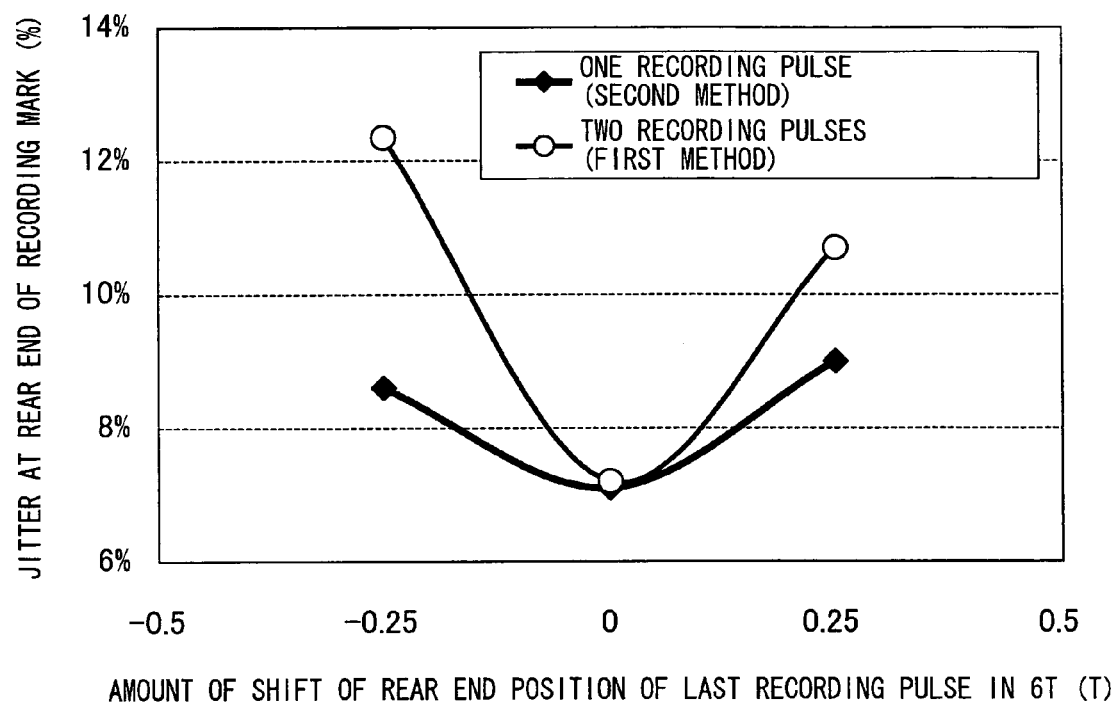
FIG. 8 is a graph indicative of a relation between: the amount of shift of a rear end position of a last recording pulse in one or two recording pulses that constitute a recording mark with a length of 6T; and jitter in the rear end of the recording mark.

Firstly, with the first and second methods, it was measured how jitters changed when rear end positions L1r and L2r of the last recording pulses of laser pulses for forming the recording mark M of 6T were moved. FIG. 8 illustrates the results of measurements of the jitters. As illustrated in FIG. 8, in the case of forming the recording mark M of 6T, formation (recording) of the recording mark M using one recording pulse resulted in wider margin of the rear end position than formation of the recording mark M using two recording pulses did.

Further, with the second and third methods, it was measured how jitters changed when rear end positions L1r and L2r of the last recording pulses of laser pulses for forming the recording mark M of 7T were moved.

Figure 9:
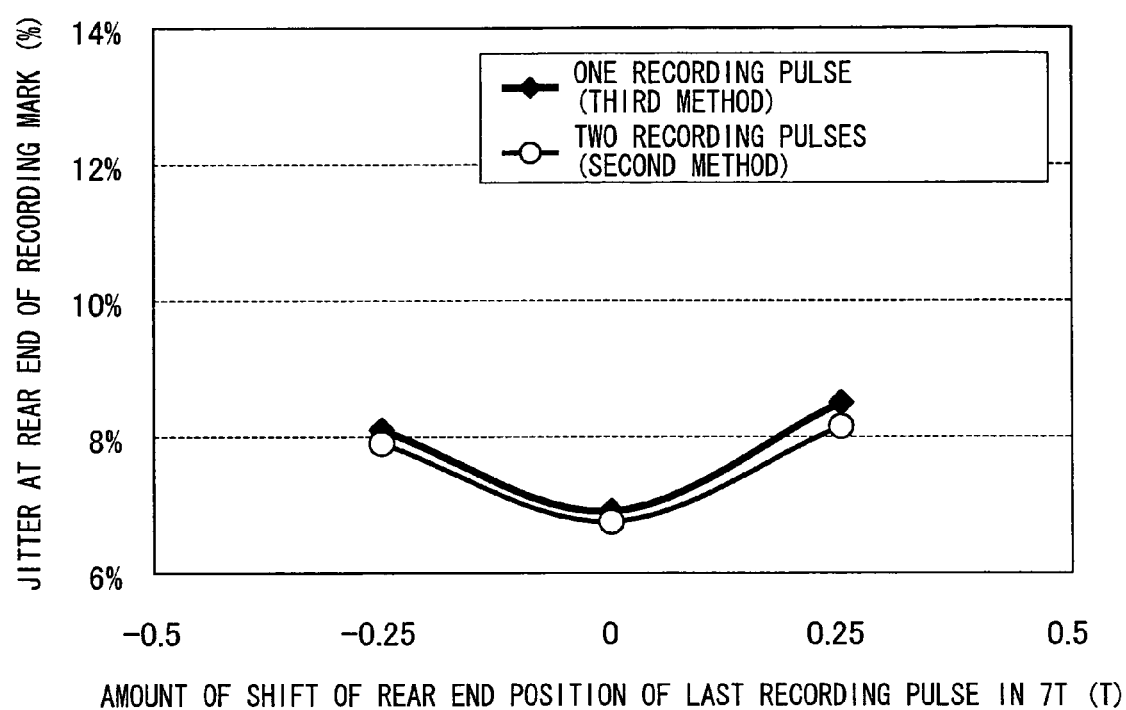
FIG. 9 is a graph indicative of a relation between: the amount of shift of a rear end position of a last recording pulse in one or two recording pulses that constitute a recording mark with a length of 7T; and jitter in the rear end of the recording mark.

FIG. 9 illustrates the results of measurements of the jitters. As illustrated in FIG. 9, in the case of forming the recording mark M of 7T, formation of the recording mark M using one recording pulse and formation of the recording mark M using two recording pulses resulted in the similar margin of the rear end positions L1r and L2r. This indicates that both of the formations may be performed in this case.

Further, with the third and fourth methods, it was measured how jitters changed when rear end positions L1r and L2r of the last recording pulses of laser pulses for forming the recording mark M of 8T were moved.

Figure 10:
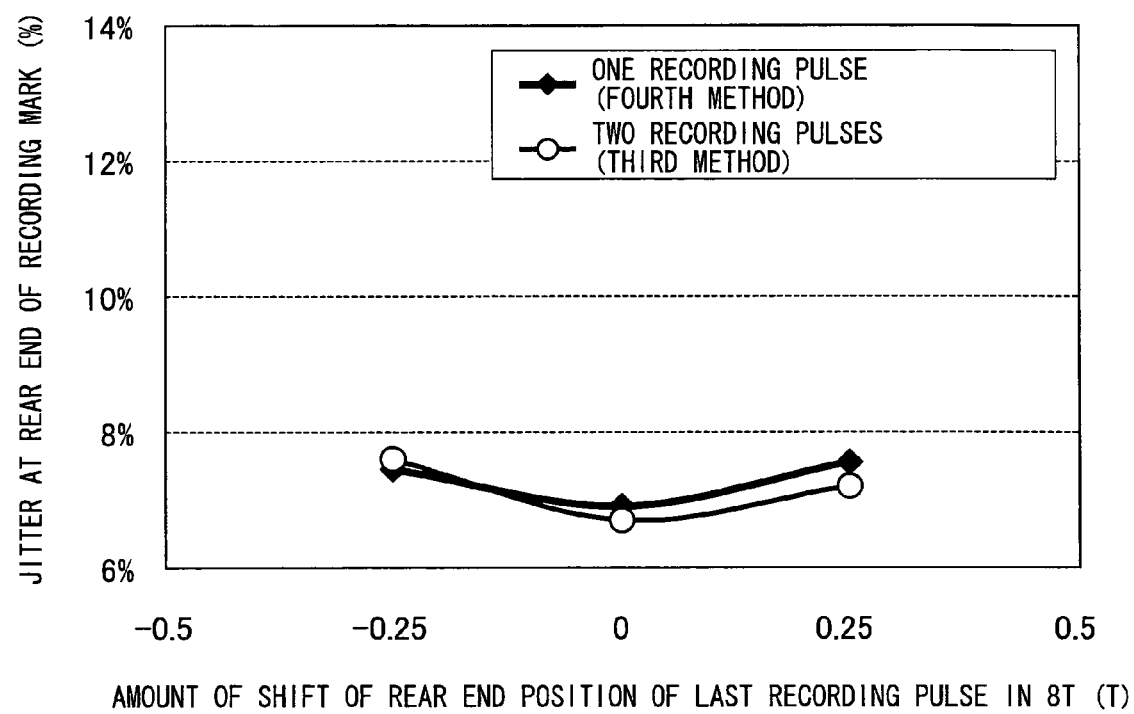
FIG. 10 is a graph indicative of a relation between: the amount of shift of a rear end position of a last recording pulse in one or two recording pulses that constitute a recording mark with a length of 8T; and jitter in the rear end of the recording mark.

FIG. 10 illustrates the results of measurements of the jitters. As illustrated in FIG. 10, in the case of forming the recording mark M of 8T, formation of the recording mark M using one recording pulse and formation of the recording mark M using two recording pulses resulted in the similar margin of the rear end positions L1r and L2r. This indicates that both of the formations may be performed in this case.

The above measurements show that in the case where the recording mark M of at least 6T or less is recorded using one recording pulse, moving the rear end positions L1r and L2r of the last recording pulses causes a relatively small increase in the jitters of the rear end of the recording mark M. This result shows that when one recording pulse is used to form a recording mark M of 6T or less and when two recording pulses are used to form a recording mark M of 7T or more, it is possible to obtain sufficient margin (setting margin) of a laser pulse for the rear end position of the last recording pulse.

Figure 11:
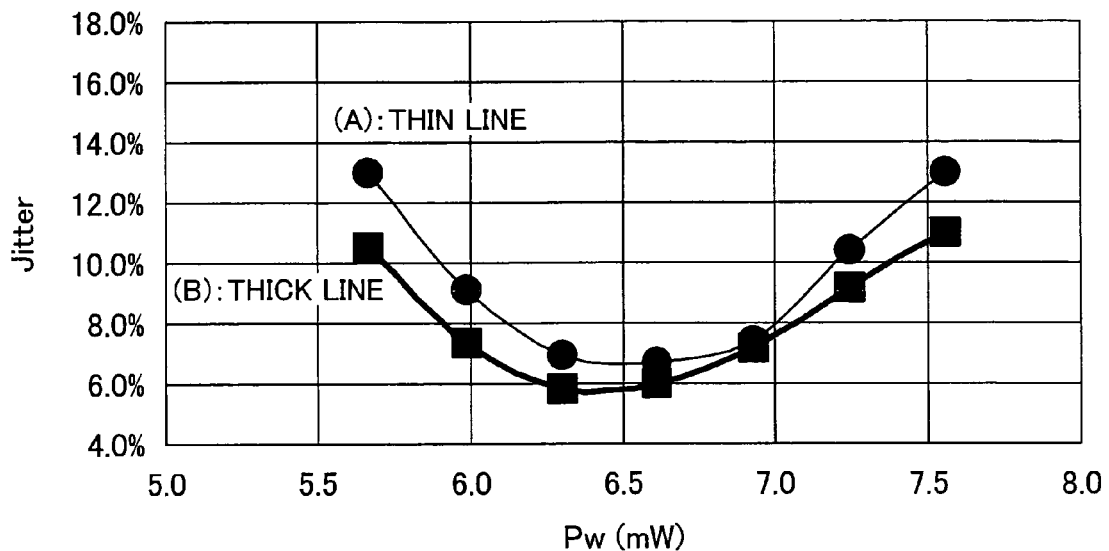
FIG. 11(a) is a drawing illustrating dependency of jitter on a recording power Pw.
FIG. 11(b) is a drawing illustrating dependency of bit error rate (BER) on a recording power Pw.
Figure 11:
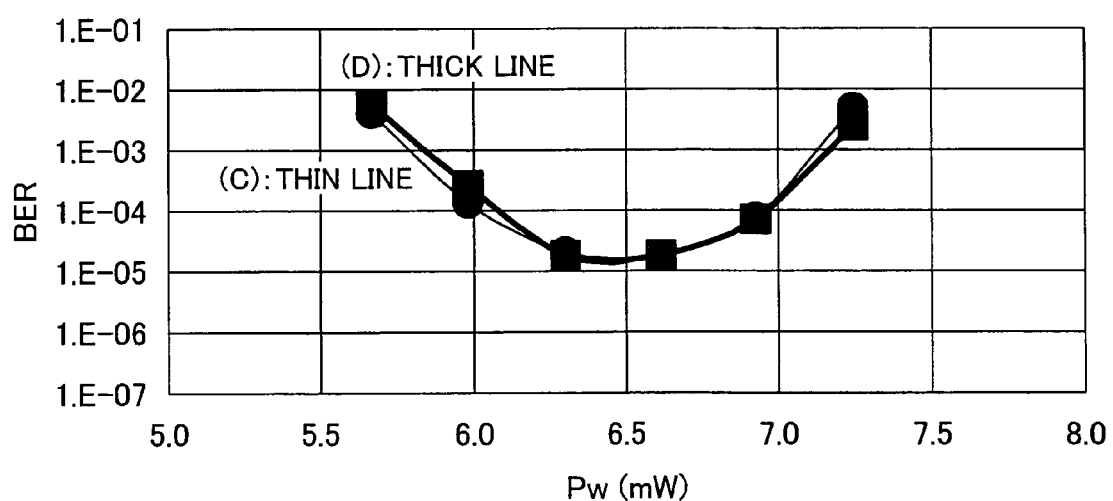

FIGS. 11(a) and 11(b) illustrate the results of evaluations of reproduction signals obtained by recording/reproduction with the recording waveform of the present embodiment.

FIG. 11(a) illustrates dependency of jitter on the recording power Pw. FIG. 11(b) illustrates dependency of bit error rate (BER) on the recording power Pw. In FIG. 11(a), the lateral axis indicates the recording power Pw (mW) and the longitudinal axis indicates jitter. In FIG. 11(b), the lateral axis indicates the recording power Pw (mW) and the longitudinal axis indicates bit error rate.

FIG. 11(a) illustrates the result of measurement of margin of the recording power Pw under a recording condition that power ratios under later-mentioned jitter best conditions are constant and the recording power Pw changes. That is, a graph (A) indicated by a thin line represents margin of the recording power Pw that was measured under a condition (a) as presented below.

Condition (a): the recording power Pw was changed with a constant ratio of the recording power Pw to the space power Ps (power ratio) under the jitter best conditions (recording power Pw=6.3 mW and space power Ps=2.8 mW).

On the other hand, a graph (B) indicated by a thick line represents margin of the recording power Pw that was measured under a condition (b) as presented below.

Condition (b): the recording power Pw was changed under a condition that PwT2 (recording power of the recording mark M of 2T (shortest mark))=7.3 mW and a ratio of Pw to PwT2 is constant, in addition to the conditions (a).

As shown by the graph (A), the recording waveform of the present embodiment ensures excellent recording. Further, as shown by the graph (B), when the PwT2 (recording power of the recording mark M of 2T (shortest mark)) is set to be 7.3 mW that is higher than other recording power, jitter is further improved than that in the graph (A).

As illustrated in FIG. 11(b), the bit error rate of the graph (C) indicated by the thin line that was measured under the jitter best condition (condition (a)) is substantially the same as the bit error rate of the graph (D) indicated by the thick line that was measured under the condition (b). That is, the graph (D) is not improved compared with the graph (C) in terms of the bit error rate. This is because PRML was used in decoding a reproduction signal and accordingly the PRML decoding corrected errors, resulting in that recording-improvement effect of the shortest mark did not appear in a bit error rate.

Figure 12:
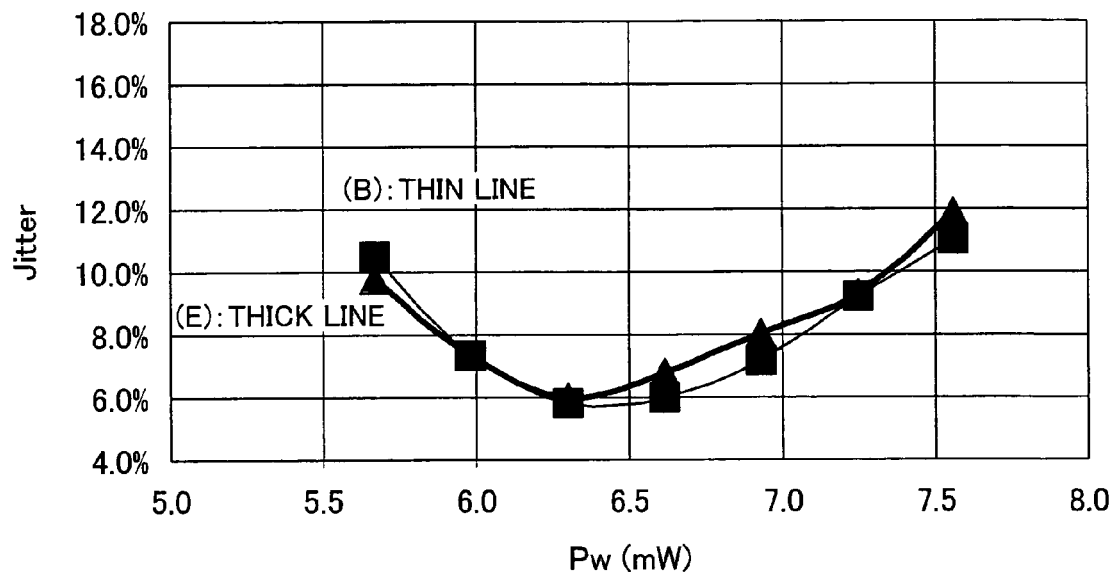
FIG. 12(a) is a drawing illustrating dependency of jitter on a recording power Pw.
FIG. 12(b) is a drawing illustrating dependency of bit error rate (BER) on a recording power Pw.
Figure 12:
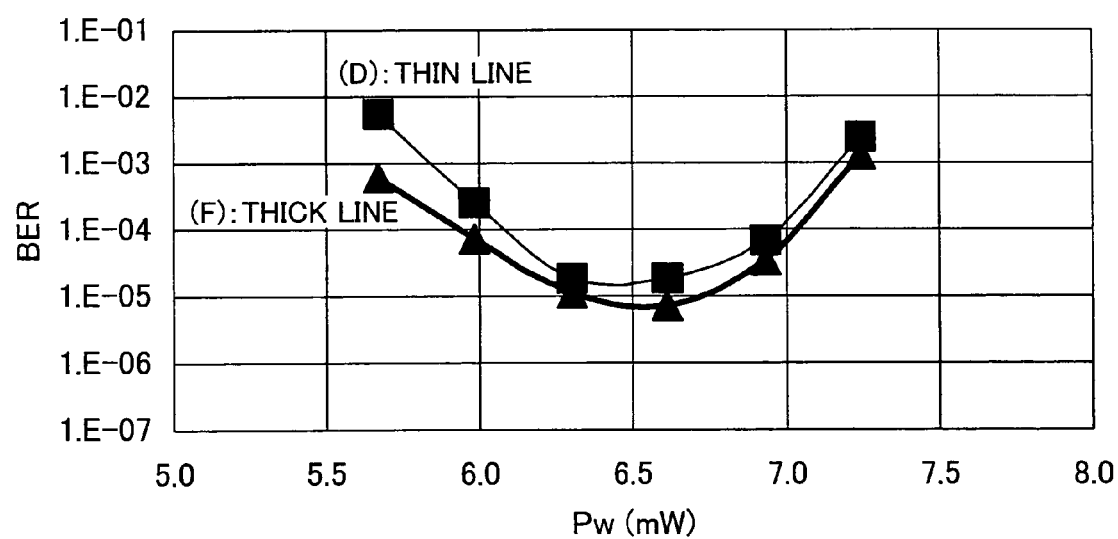

As with FIGS. 11(a) and 11(b), FIGS. 12(a) and 12(b) illustrate the results of evaluations of reproduction signals that were recorded and reproduced with the recording waveform of the present embodiment. The graph (B) in FIG. 12(a) and the graph (D) in FIG. 12(b) are equal to the graph (B) in FIG. 11(a) and the graph (D) in FIG. 11(b) that were measured under the condition (b).

The graph (F) indicated by the thick line in FIG. 12(b) represents margin of the recording power Pw measured under a condition (c) as presented below.

Condition (c): recording powers of the shortest mark (2T) and second shortest mark (3T) were set to values higher than recording power Pw of other marks (PwT2=PwT3=7.3 mW), and a ratio of Pw to PwT2 (PwT2=PwT3) is constant in addition to the condition (a). Under such condition, other recording power was changed.

As shown by the graph (F), the bit error rate was improved compared with that of the graph (A). This is because recording-improvement effect of a recording mark M of 3T reduces slight distortion of a reproduction signal of a mark length of the recording mark M of 3T.

On the other hand, as illustrated in FIG. 12(a), in terms of jitter, the graph (B) is not so different from the graph (E) indicated by the thick line that was measured under the condition (c). This is because the amplitude of the recording mark M of 3T has a sufficient size for measurement of jitter and accordingly recording-improvement effect of the shortest mark (2T) and the second shortest mark (3T) does not appear in jitter.

Further, it is preferable that the resting period tm that is positioned between two or more recording pulses and that includes the middle power Pm less than a laser power of the recording pulse (recoding power Pw) is longer than falling time td of laser light. In general, it is ideal to change the size of laser power in such a manner that a laser pulse exhibits a rectangular shape (rectangular wave) as shown by a full line in FIG. 13(a). However, an actual laser pulse has rising time to and falling time td as shown by a broken line in FIG. 13(a).

An explanation is made as to a case where two recording pulses in FIG. 1 (waveforms (f) and (g)) are used. As illustrated in FIG. 13(a), the resting period tm is longer than the falling time td of laser light. In a case where the resting period tm is longer than the falling time td of laser light, laser power drops from the recording power Pw to the middle power Pm and then returns to the recording power Pw, thereby controlling the amount of heat to be applied on the optical disc 8 (FIG. 2). Consequently, it is possible to obtain a laser pulse with a desired laser power and to control the amount of heat to be applied on the optical disc 8.

In contrast, as illustrated in FIG. 13(b) that is a reference example for the present embodiment, in a case where the resting period tm is shorter than the falling time td of laser light, a laser power drops from the recording power Pw but returns to the recording power Pw without reaching the middle power Pm. This results in a laser pulse without reaching the middle power Pm that is a desired power. Consequently, it is impossible to control the amount of heat to be applied on the optical disc 8.

Further, it is preferable that tm=1T. That is, it is preferable that the resting period tm is equal to the channel clock T (1T). For example, when frequency of the channel clock is 264 MHz, 1T is approximately 3.8 ns. Further, falling time td of laser light necessary for the laser light to have a predetermined laser power is approximately 2 ns. Therefore, when the resting period tm is set to be 1T, the resting period tm is longer than the falling time td of laser light. Consequently, it is possible to obtain a laser pulse with a desired laser power for the same reason as described above, enabling control of the amount of heat to be applied on the optical disc 8.

Further, it is preferable that Pm=Ps among two or more recording pulses. That is, it is preferable that the middle power Pm is equal to the space power Ps. When Pm=Ps, it is possible to reduce the kinds of laser powers in use. That is, it is possible to simplify a circuit configuration of the information recording device.

Figure 14:
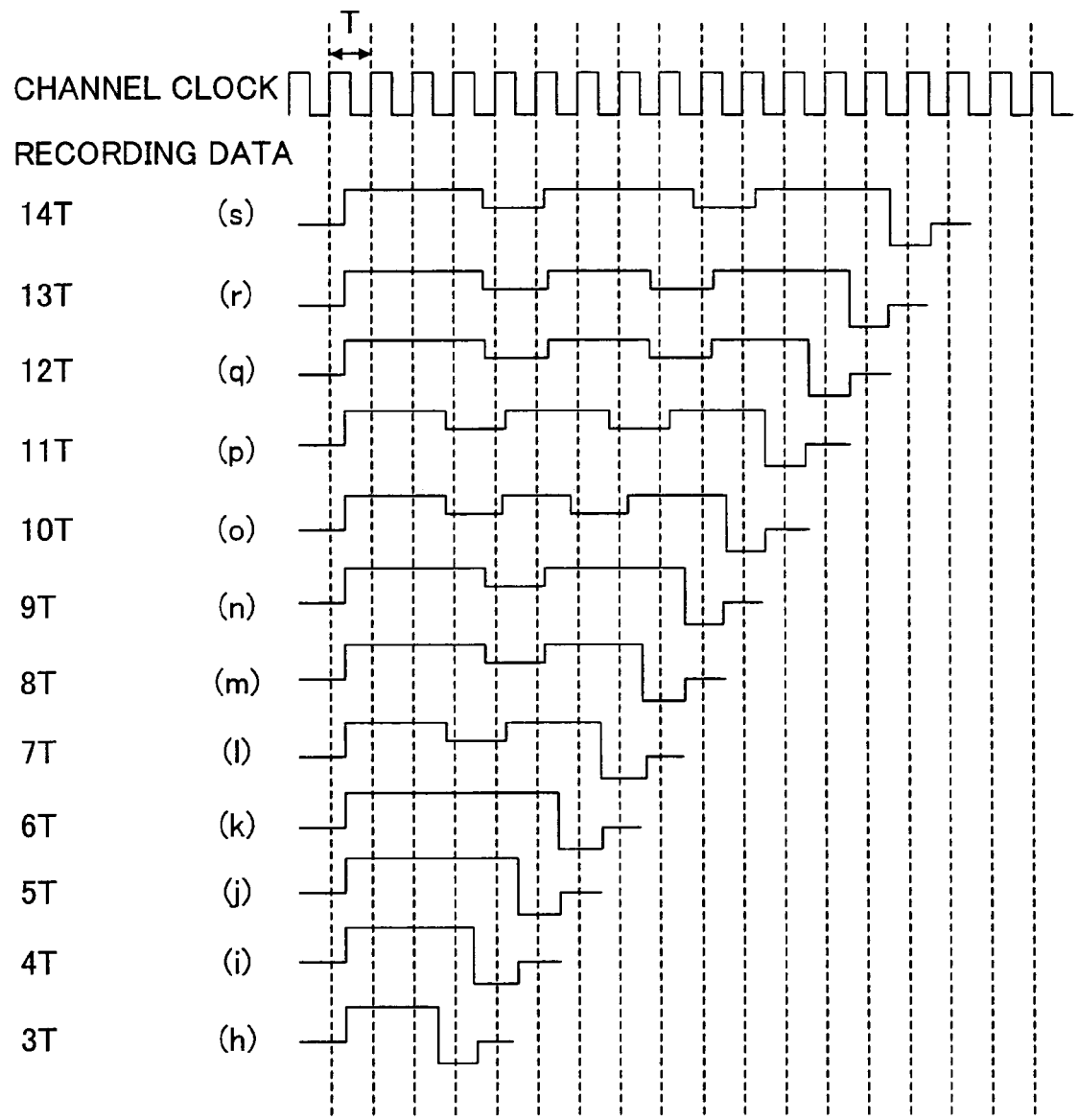
FIG. 14 is a waveform chart illustrating an example of a laser pulse in the information recording method of the present embodiment, the laser pulse being according to another embodiment.
Figure 15:
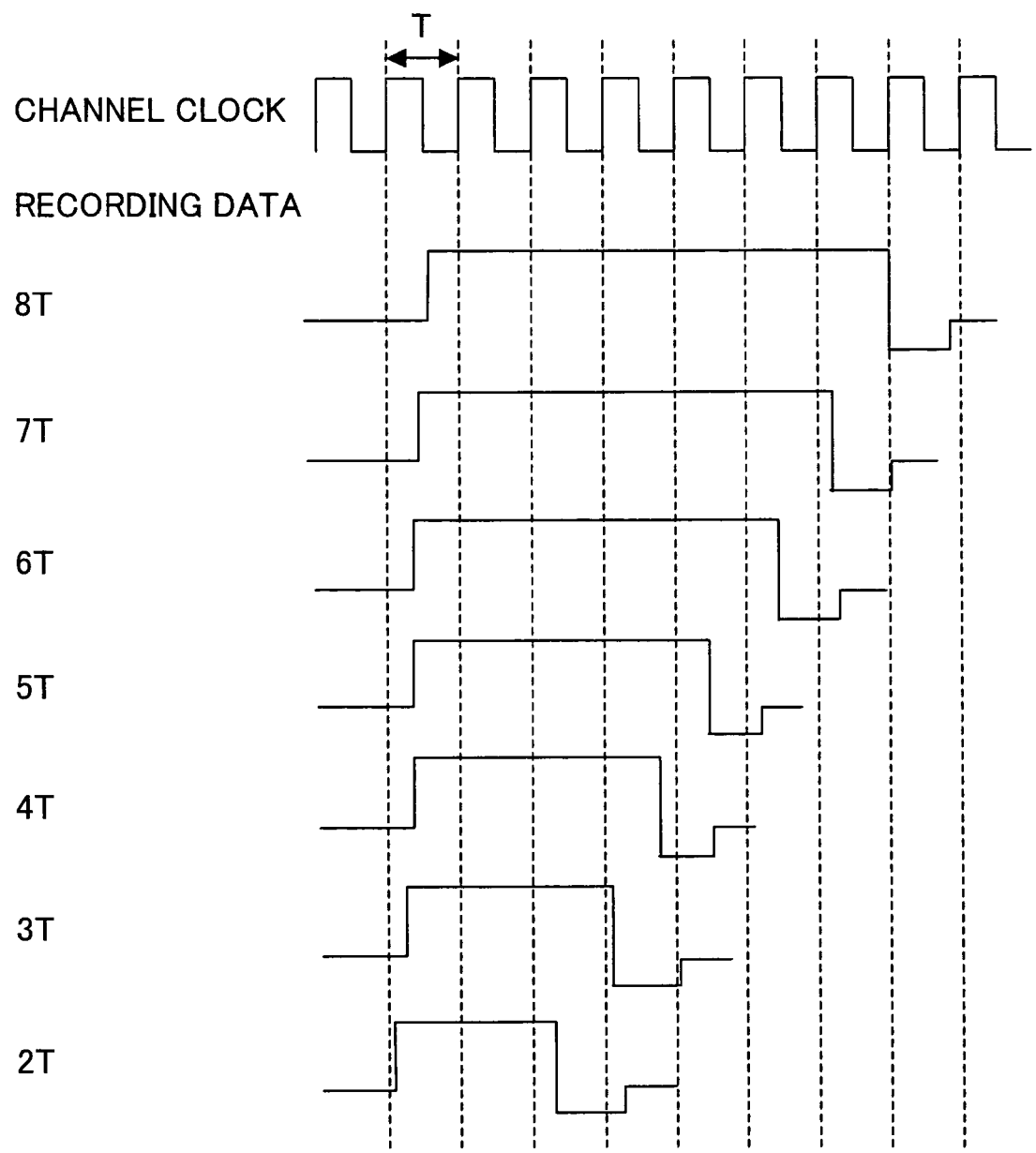
FIG. 15 is a drawing illustrating an example of a laser pulse made of one recording pulse in a conventional information recording method.
Figure 16:
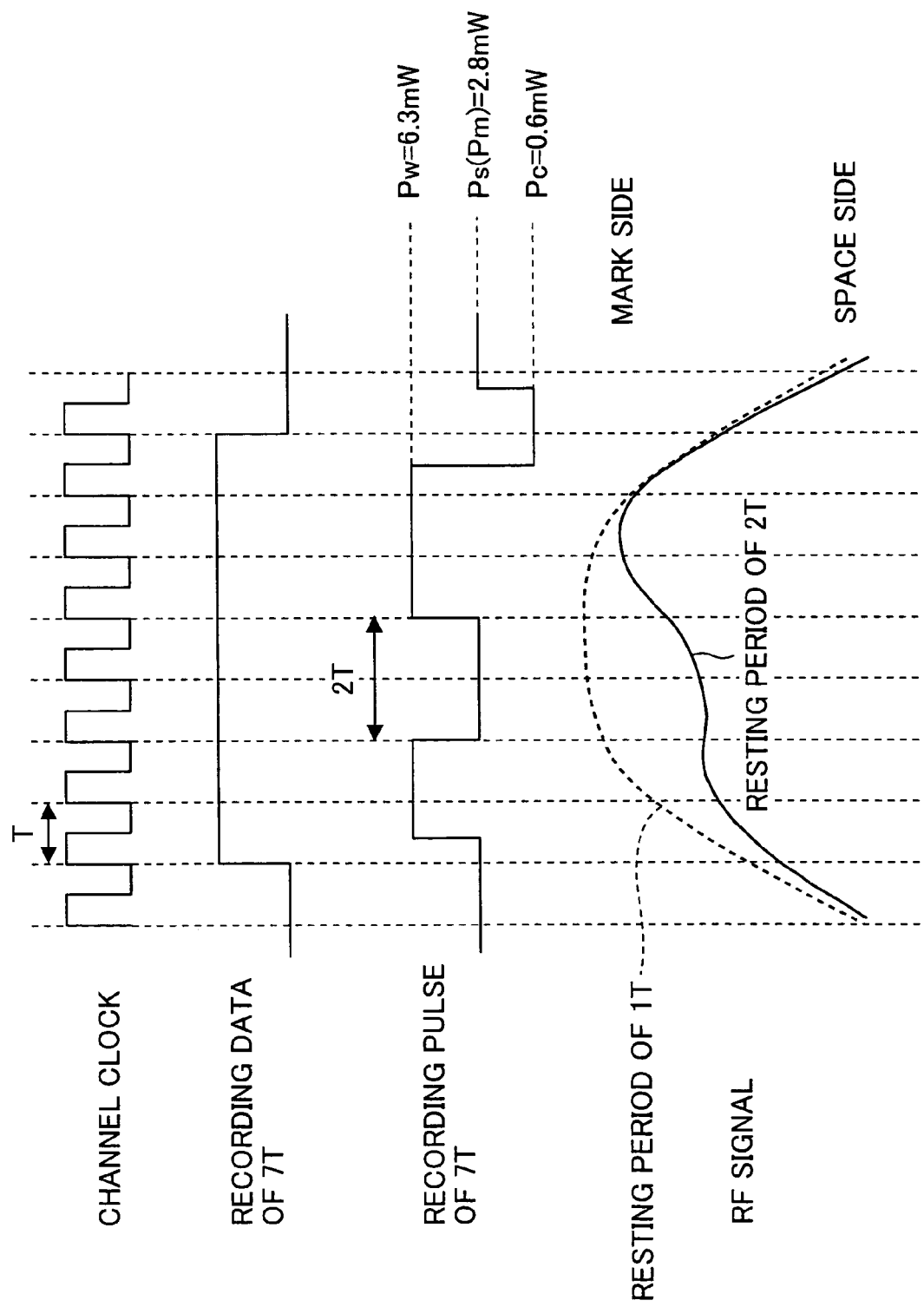
FIG. 16 is a drawing illustrating an example of a recording/reproducing signal in the conventional information recording method.

Above explanations were made as to a case where the recording waveform was based on the recording data sequence subjected to (1, 7) RLL modulation. However, it is easy to design that the recording waveform is based on other modulated recording data sequence. FIG. 14 illustrates a recording waveform of a recording data sequence in a case where the recording data sequence is used in 8/16 modulation. As illustrated in FIG. 14, as the longest recording mark gets longer, the recording mark M is formed using two or three recording pulses divided by a resting period tm that is constant regardless of the mark length of the recording mark M.

As illustrated in FIG. 14, recording marks M of 3T to 6T are formed using one recording pulse (see waveforms (h) to (k)), recording marks M of 7T to 9T are formed using two recording pulses (see waveforms (l) to (n)), and recording marks M of 10T to 14T are formed using three recording pulses (see waveforms (o) to (s)). In the case where the three recording pulses are divided by resting periods, a plurality of resting periods tm are formed to form the same recording mark M. In this case, these resting periods have a constant length.

The above explanations were made as to a case where conditions tm=1T and Pm=Ps were met. However, it is not necessarily required to meet the two conditions. Sufficient setting margin of a laser pulse can be obtained in a case where only one of the two conditions is met or in a case where neither of the two conditions is met. This is because an increase in a temperature of a recording medium can be controlled by a relation between the resting period tm and the recording power Pw.

With the control, it is possible to form a long recording mark M with a uniform width and with sufficient setting margin of a laser pulse, by using a relatively low laser power. For example, an increase in a temperature of the present optical disc 101 can be controlled by a product (area) of tm and (Pw−Pm).

In the above embodiments, explanations of the present invention were made based on the experiments with a recordable optical disc. However, the present invention is applicable to a phase change medium or other optical disc capable of recording information by heat energy.

Further, there are provided an information recording device and an information recording method each ensuring sufficient setting margin of a laser pulse and allowing formation of a recording mark M with a uniform width. Further, in an information recording device for forming a recording mark M corresponding to a recording data sequence by irradiating laser light to an optical recording medium, one recording pulse is generated to form a recording mark with a length of 6T (T is a channel clock cycle) or less and two or more recording pulses are generated to form a recording mark M with a length more than 6T.

An information recording device of the present invention may be arranged so as to be an information recording device which irradiates laser light to an information recording medium to form a recording mark corresponding to a recording data sequence, comprising: a light source for emitting the laser light; signal generating means for generating a driving signal based on the recording data sequence; and recording means for irradiating a laser pulse onto the information recording medium by driving the light source in response to the driving signal, the driving signal being indicative of a mark period having a recording pulse with a recording power to form the recording mark and indicative of a space period when the recording mark is not formed, the signal generating means generating one recording pulse to form a recording mark with less than a predetermined length and generating two or more recording pulses to form a recording mark with a predetermined length or more, the signal generating means generating between the recording pulses a resting period with a second recording power less than the recording power, the resting period being constant.

Further, at least one resting period may be provided and be constant regardless of the length of a recording mark.

An information recording method of the present invention may be arranged so as to be an information recording method, in which laser light is irradiated to an information recording medium to form a recording mark corresponding to a recording data sequence, the information recording method comprising: a first step of generating a driving signal based on the recording data sequence; and a second step of irradiating a laser pulse onto the information recording medium to record information by driving a light source for irradiating laser light in accordance with the driving signal, the driving signal being indicative of a mark period having a recording pulse with a recording power to form the recording mark and indicative of a space period when the recording mark is not formed, one recording pulse is generated to form a recording mark with less than a predetermined length and two or more recording pulses are generated to form a recording mark with a predetermined length or more in the first step, and when the recording mark with a predetermined length or more is generated, a resting period with a second recording power less than the recording power being provided between the recording pulses and the resting period being constant.

Further, at least one resting period may be provided and be constant regardless of the length of a recording mark.

Further, it is preferable to arrange the information recording device of the present invention so that the recording mark with less than a predetermined length has a mark length ranging from the shortest mark length to 5T and the recording mark with a predetermined length or more has a mark length ranging from 6T to the longest mark length.

Whether the recording mark has a uniform width or not can be examined by detecting the widths of a front end and a rear end of the recording mark. The inventors of the present invention have found that when the recording mark with less than a predetermined length has a mark length ranging from the shortest mark length to 5T and the recording mark with a predetermined length or more has a mark length ranging from 6T to the longest mark length, the widths of the front end and the rear end of the recording mark are almost the same.

Further, it is preferable to arrange the information recording device of the present invention so that the recording mark with less than a predetermined length has a mark length ranging from the shortest mark length to 6T and the recording mark with a predetermined length or more has a mark length ranging from 7T to the longest mark length.

Conventionally, setting difference in laser pulse (difference in actual emission waveform) with respect to each drive has had a considerable adverse affect on high-velocity recording. The adverse affect have made it difficult to form a recording mark that can be actually used and made it impossible to obtain sufficient setting margin of a laser pulse.

On the other hand, the inventors have found that with the aforementioned arrangement, the increase in jitter at the rear end of the recording mark is relatively small even when the rear end position of the last recording pulse is moved. Therefore, even when channel clock frequency is high, it is possible to form a recording mark with a uniform width, having sufficient margin of a laser pulse.

Further, it is preferable to arrange the information recording device of the present invention so that the resting period is longer than falling time of the laser light.

With the arrangement, the resting period is longer than the falling time of the laser light. Consequently, a laser power drops from a recording power to a middle power and then returns to the recording power again. This allows control of the amount of heat to be applied on an information recording medium. This makes it possible to irradiate a desired laser pulse without unsuitably deforming the laser pulse. Therefore, it is possible to form a suitable recording mark on the information recording medium.

Further, it is preferable to arrange the information recording device of the present invention so that the resting period is equal to 1T.

With the arrangement, the resting period is surely longer than the falling time of laser light. For example, when frequency of the channel clock is 264 MHz, 1T is approximately 3.8 ns. Further, falling time of laser light necessary for the laser light to have a predetermined laser power is approximately 2 ns. Therefore, when the resting period is set to be 1T that is longer than the falling time of laser light, the resting period is longer than the falling time of laser light. This makes it possible to irradiate a desired laser pulse without unsuitably deforming the laser pulse. Therefore, it is possible to form a suitable recording mark on the information recording medium.

Further, it is preferable to arrange the information recording device of the present invention so that a space power that is a laser power for a space period when the recording mark is not formed is set to be equal to the second recording power.

With the arrangement, it is possible to reduce the kinds of laser powers in use by one. This simplifies a circuit configuration of the information recording device.

Further, it is preferable to arrange the information recording device of the present invention so that a recording power for forming a recording mark with a shortest mark length is set to be higher than a recording power for forming a recording mark other than the recording mark with the shortest mark length.

The inventors of the present invention have found that with the arrangement, jitter of a reproduction signal reproduced after recording is improved, thereby increasing recording performance.

Further, it is preferable to arrange the information recording device of the present invention so that a recording power for forming a recording mark with a second shortest mark length is set to be higher than a recording power for forming a recording mark other than the recording mark with the shortest mark length and the recording mark with the second shortest mark length.

The inventors of the present invention have found that with the arrangement, jitter and error rate of a reproduction signal reproduced after recording is improved, thereby increasing recording performance.

Further, it is preferable to arrange the information recording medium of the present invention so that information is recorded by one of the recording mark formation method, the information recording device, and the information recording method.

Further, it is preferable to arrange the information recording medium of the present invention so that recording information for recording through one of the recording mark formation method and the information recording method is recorded.

As described above, the method of the present invention for forming a recording mark, the information recording device of the present invention, and the information recording method of the present invention are designed such that the resting period is constant regardless of the mark length of the recording mark and regardless of the number of the divided recording pulses.

Therefore, it is possible to form a recording mark with a uniform width by use of a low laser power and to reduce the number of parameters for determining a recording waveform, when forming a long recording mark.

The present invention is not limited to the above embodiments, and a variety of modifications are possible within the scope of the following claims, and embodiments obtained by combining technical means respectively disclosed in the above embodiments are also within the technical scope of the present invention.

INDUSTRIAL APPLICABILITY

The present invention is applicable to a liquid crystal display device. In particular, the present invention is applicable to a TV receiver.

The invention claimed is:

1. A recording mark formation method,
comprising the step of forming a recording mark in such a manner that a recording mark with less than a predetermined mark length is formed using one recording pulse with a first recording power and a recording mark with the predetermined mark length or more is formed using a plurality of recording pulses each with the first recording power that are divided by a resting period with a second recording power less than the first recording power,
the resting period being set to be constant regardless of the mark length of the recording mark and regardless of the number of the divided recording pulses, and
the recording mark with less than the predetermined mark length having a mark length ranging from a shortest mark length to 5T, and the recording mark with the predetermined mark length or more having a mark length ranging from 6T to a longest mark length.

2. A recording mark formation method,
comprising the step of forming a recording mark in such a manner that a recording mark with less than a predetermined mark length is formed using one recording pulse with a first recording power and a recording mark with the predetermined mark length or more is formed using a plurality of recording pulses each with the first recording power that are divided by a resting period with a second recording power less than the first recording power,
the resting period being set to be constant regardless of the mark length of the recording mark and regardless of the number of the divided recording pulses, and
the recording mark with less than the predetermined mark length having a mark length ranging from a shortest mark length to 6T, and the recording mark with the predetermined mark length or more having a mark length ranging from 7T to a longest mark length.

3. An information recording method,
comprising the step of forming a recording mark on a recording medium in such a manner that a recording mark with less than a predetermined mark length is formed using one recording pulse with a first recording power and a recording mark with the predetermined mark length or more is formed using a plurality of recording pulses each with the first recording power that are divided by a resting period with a second recording power less than the first recording power,
the resting period being set to be constant regardless of the mark length of the recording mark and regardless of the number of the divided recording pulses, and
the recording mark with less than the predetermined mark length having a mark length ranging from a shortest mark length to 5T, and the recording mark with the predetermined mark length or more having a mark length ranging from 6T to a longest mark length.

4. An information recording method,
comprising the step of forming a recording mark on a recording medium in such a manner that a recording mark with less than a predetermined mark length is formed using one recording pulse with a first recording power and a recording mark with the predetermined mark length or more is formed using a plurality of recording pulses each with the first recording power that are divided by a resting period with a second recording power less than the first recording power,
the resting period being set to be constant regardless of the mark length of the recording mark and regardless of the number of the divided recording pulses, and
the recording mark with less than the predetermined mark length having a mark length ranging from a shortest mark length to 6T, and the recording mark with the predetermined mark length or more having a mark length ranging from 7T to a longest mark length.

5. An information recording device,
comprising recording mark formation means for forming a recording mark on an information recording medium by irradiating laser light,
the recording mark formation means forming a recording mark in such a manner that a recording mark with less than a predetermined mark length is formed using one recording pulse with a first recording power and a recording mark with the predetermined mark length or more is formed using a plurality of recording pulses each with the first recording power that are divided by a resting period with a second recording power less than the first recording power,
the recording mark formation means setting the resting period to be constant regardless of the mark length of the recording mark and regardless of the number of the divided recording pulses, and
the recording mark with less than the predetermined mark length having a mark length ranging from a shortest mark length to 5T, and the recording mark with the predetermined mark length or more having a mark length ranging from 6T to a longest mark length.

6. An information recording device,
comprising recording mark formation means for forming a recording mark on an information recording medium by irradiating laser light,
the recording mark formation means forming a recording mark in such a manner that a recording mark with less than a predetermined mark length is formed using one recording pulse with a first recording power and a recording mark with the predetermined mark length or more is formed using a plurality of recording pulses each with the first recording power that are divided by a resting period with a second recording power less than the first recording power,
the recording mark formation means setting the resting period to be constant regardless of the mark length of the recording mark and regardless of the number of the divided recording pulses, and
the recording mark with less than the predetermined mark length having a mark length ranging from a shortest mark length to 6T, and the recording mark with the predetermined mark length or more having a mark length ranging from 7T to a longest mark length.

7. The information recording device as set forth in claim 5, wherein the resting period is set to be longer than falling time of the laser light.

8. The information recording device as set forth in claim 5, wherein the resting period is set to be equal to 1T.

9. The information recording device as set forth in claim 5, wherein a space power that is a laser power for a space period when the recording mark is not formed is set to be equal to the second recording power.

10. The information recording device as set forth in claim 5, wherein a recording power for forming a recording mark with a shortest mark length is set to be higher than a recording power for forming a recording mark other than the recording mark with the shortest mark length.

11. The information recording device as set forth in claim 10, wherein a recording power for forming a recording mark with a second shortest mark length is set to be higher than a recording power for forming a recording mark other than the recording mark with the shortest mark length and the recording mark with the second shortest mark length.

12. An information recording medium, in which information is recorded by an information recording device as set forth in claim 5.

13. An information recording medium, in which information is recorded through a recording mark formation method as set forth in claim 1.

14. An information recording medium, in which recording information used to record information through a recording mark formation method as set forth in claim 1 is recorded.

15. An information recording medium, in which information is recorded through an information recording method as set forth in claim 3.

16. An information recording medium, in which recording information used to record information through an information recording method as set forth in claim 3 is recorded.

17. An information recording device,
comprising recording mark formation means for forming a recording mark on an information recording medium by irradiating laser light,
the recording mark formation means forming a recording mark in such a manner that a recording mark with less than a predetermined mark length is formed using one recording pulse with a first recording power and a recording mark with the predetermined mark length or more is formed using a plurality of recording pulses each with the first recording power that are divided by a resting period with a second recording power less than the first recording power,
the recording mark formation means setting the resting period to be constant regardless of the mark length of the recording mark and regardless of the number of the divided recording pulses, and
a recording power for forming a recording mark with a shortest mark length being set to be higher than a recording power for forming a recording mark other than the recording mark with the shortest mark length.

18. The information recording device as set forth in claim 17, wherein a recording power for forming a recording mark with a second shortest mark length is set to be higher than a recording power for forming a recording mark other than the recording mark with the shortest mark length and the recording mark with the second shortest mark length.

* * * * *